United States Patent [19]
Kishigami et al.

[11] Patent Number: 5,908,464
[45] Date of Patent: Jun. 1, 1999

[54] TRAFFIC INFORMATION DISPLAY DEVICE METHOD OF DISPLAYING TRAFFIC INFORMATION AND MEDIUM ON WHICH DISPLAY CONTROL PROGRAM FOR USE IN TRAFFIC INFORMATION DISPLAY DEVICE IS RECORDED

[75] Inventors: Keiju Kishigami; Katsuro Hayami; Hidehiko Ohki, all of Tokyo, Japan

[73] Assignee: Mitsubishi Denki Kabushiki Kaisha, Tokyo, Japan

[21] Appl. No.: 08/841,632

[22] Filed: Apr. 30, 1997

[30] Foreign Application Priority Data

Oct. 25, 1996 [JP] Japan ................................. 8-283875

[51] Int. Cl.$^6$ ..................................................... G06G 7/78
[52] U.S. Cl. .......................... 701/208; 701/212; 701/117; 701/209; 340/988; 340/990; 340/995
[58] Field of Search ..................................... 701/208, 207, 701/200, 201, 209, 117, 118; 340/988, 990, 995, 905, 991, 993; 73/178 R; 345/146, 8

[56] References Cited

U.S. PATENT DOCUMENTS

| | | | |
|---|---|---|---|
| 5,089,826 | 2/1992 | Yano et al. | 701/208 |
| 5,189,430 | 2/1993 | Yano et al. | 701/212 |
| 5,257,023 | 10/1993 | Furuya | 701/117 |
| 5,274,387 | 12/1993 | Kakihara et al. | 701/209 |
| 5,293,163 | 3/1994 | Kakihara et al. | 701/208 |
| 5,313,200 | 5/1994 | Sone | 701/117 |
| 5,473,324 | 12/1995 | Ueno | 340/990 |
| 5,629,854 | 5/1997 | Schulte | 701/207 |
| 5,712,632 | 1/1998 | Nishimura et al. | 701/201 |

FOREIGN PATENT DOCUMENTS

| | | |
|---|---|---|
| 4344326 | 7/1994 | Germany . |
| 19636056 | 3/1997 | Germany . |
| 4-40596 | 2/1992 | Japan . |
| 7-29097 | 1/1995 | Japan . |
| A-8-63094 | 3/1996 | Japan . |
| 9-73599 | 3/1997 | Japan . |

*Primary Examiner*—Jacques H. Louis-Jacques
*Attorney, Agent, or Firm*—Sughrue, Mion, Zinn, Macpeak & Seas, PLLC

[57] ABSTRACT

A traffic information display device including a current position detecting unit for detecting the current position of a vehicle in which the traffic information display device is mounted, a road map storing unit for storing road map data, a map display control unit for displaying a road map image associated with an area in the vicinity of the current position of the vehicle on the screen of a display device on the basis of the current position from the current position detecting unit and road map data from the road map storing unit, a traffic information receiving unit for receiving traffic information, a traffic information display control unit for displaying traffic information from the traffic information receiving unit on the road map image displayed on the screen of the display device, and a traffic information display restricting unit for restricting a display of traffic information about a predetermined area of the on-screen road map image so as to emphasize traffic information about the remaining area of the on-screen map image including the current position of the vehicle other than the predetermined area.

21 Claims, 18 Drawing Sheets

TRAFFIC INFORMATION DISPLAY DEVICE METHOD OF DISPLAYING TRAFFIC INFORMATION AND MEDIUM ON WHICH DISPLAY CONTROL PROGRAM FOR USE IN TRAFFIC INFORMATION DISPLAY DEVICE IS RECORDED

BACKGROUND OF THE INVENTION

1. Field of the Invention

The present invention relates to a traffic information display device for displaying traffic information delivered thereto on a map image displayed on the display screen thereof, a method of displaying traffic information delivered thereto, and a recording medium on which a display control program for use in the traffic information display device is recorded.

2. Description of the Prior Art

In general, when a vehicle is moving in a well-trafficked area or an area including a number of roads, a vehicle navigation device carried in the vehicle receives a large amount of traffic information. Therefore, when all the traffic information delivered to the vehicle navigation device is displayed on the screen thereof, the amount of on-screen information is too large for the user to easily recognize the traffic information displayed on the screen of vehicle navigation device. Particularly, since most roads in a well-trafficked area such as a midtown area are congested or dense, a large amount of traffic jam information displayed on the traffic information display device makes the visibility of the display screen worse. When a number of display marks such as red lines each showing a congested area of each road are displayed on the screen, they make it more difficult for the user to easily recognize all the on-screen information.

A vehicle navigation device as disclosed in Japanese Patent Application Laying Open (KOKAI) No. 8-63094 intended to solve the above problem is known. Referring now to FIG. 26, there is illustrated a block diagram showing the structure of the prior art vehicle navigation device. In FIG. 26, reference numeral 1 denotes a bearing sensor for measuring the direction in which the vehicle is headed, 2 denotes a speed sensor for measuring the speed of the vehicle to furnish a signal with pulses the number of which is determined by the vehicle speed, and 3 denotes a map storage memory for storing road map data including intersection network data.

Furthermore, reference numeral 4 denotes a central processing unit (CPU) which receives information about the vehicle from the bearing sensor 1, speed sensor 2, and so on, and then performs various types of operations on the information about the vehicle and display control processing, 5 denotes a ROM for storing a control program and the like which are executed by the CPU 4, and 6 denotes a RAM for storing operation results from the CPU 4.

In addition, reference numeral 7 denotes a VRAM for storing image data generated by the CPU 4, 8 denotes a display such as a cathode-ray tube display or a liquid crystal display, on the screen of which display data such as map information and traffic jam information are displayed, 9 denotes a console panel through which the user can select information to be displayed on the screen of the display 8, 10 denotes a global positioning system (GPS) receiver which receives radio waves from GPS satellites to detect the position of the vehicle, and 11 denotes a traffic information receiver which receives various types of road traffic information such as traffic jam information transmitted thereto through a beacon or an FM multiplex broadcasting.

Furthermore, reference numeral 12 denotes an interface circuit which can transmit a signal among the bearing sensor 1, speed sensor 2, map storage memory 3, CPU 4, ROM 5, RAM 6, VRAM 7, display 8, console panel 9, GPS receiver 10, and traffic information receiver 11.

In operation, the CPU 4 detects the current position of the vehicle by means of the GPS receiver 10 first, and then reads road map data about an area in the vicinity of the current position from the map storage memory 3. When the vehicle navigation device receives traffic information, the CPU 4 computes the mean value of the extent of traffic congestion in all links to be displayed on the display 8, and after that computes the number of the links to be displayed on the display 8.

When the number of the links is equal to or larger than a threshold value A and the mean value of the extent of traffic congestion is larger than a threshold value B, the vehicle navigation device displays all congested links on the screen of the display 8 with a thick line having a predetermined color. On the other hand, when the number of the links is equal to or larger than the threshold value A and the mean value of the extent of traffic congestion is smaller than the threshold value B, the vehicle navigation device displays all links not congested on the screen of the display 8 with the thick line having the predetermined color.

Thus, the prior art traffic information display device is adapted to reduce the difficulty in recognizing traffic information on the display screen by emphasizing the display of the on-screen congested links when it determines that the mean extent of traffic congestion exceeds the predetermined threshold value.

While the prior art traffic information display device can emphasize the display of all congested roads on the screen thereof or vary the number of roads displayed on the screen thereof to reduce the difficulty in recognizing the whole of the display screen, the prior art traffic information display device suffers from the disadvantage that the user cannot recognize needed information because it does not make a distinction between information necessary for the user and information unnecessary for the user.

For example, since the traffic information display device emphasizes the display of all congested on-screen roads when it receives a large amount of traffic jam information, there may be a case where the user cannot recognize needed traffic jam information about an area in the vicinity of the vehicle and the vicinity of a path through which the vehicle is scheduled to move. On the other hand, the variation of the number of on-screen roads may cause the disappearance of needed road information from the display screen.

SUMMARY OF THE INVENTION

The present invention is made in order to overcome the above problem. It is therefore an object of the present invention is to provide a traffic information display device, a method of displaying traffic information, and a medium on which a program for use in traffic information display devices for controlling a display of traffic information, which make it possible for the user to efficiently recognize needed information such as traffic jam information or information about roads.

In accordance with the present invention, there is provided a traffic information display device comprising a current position detecting unit for detecting a current position of a vehicle in which the traffic information display device is mounted, a road map storing unit for storing road map data, a map display control unit for displaying a road map image associated with an area in the vicinity of the current position of the vehicle on the screen of a display device on the basis of the current position from the current position detecting unit and road map data from the road map storing unit, a traffic information receiving unit for receiving traffic information, a traffic information display control unit for displaying traffic information from the traffic information receiving unit on the road map image displayed on the screen of the display device, and a traffic information display restricting unit for restricting a display of traffic information about a predetermined area of the on-screen road map image so as to emphasize traffic information about the remaining area of the on-screen map image including the current position of the vehicle other than the predetermined area.

In accordance with a preferred embodiment of the present invention, the traffic information display restricting unit can make the display of the traffic information about the predetermined area quiet as compared with that of the traffic information about the remaining area.

In accordance with another preferred embodiment of the present invention, the traffic information display restricting unit can disable the display of the traffic information about the predetermined area.

In accordance with another preferred embodiment of the present invention, the traffic information display device further comprises a traffic information display restricted area indicating unit for producing a display for making a distinction between the predetermined area in which a display of traffic information is restricted and the remaining area in which a display of traffic information is allowed. Preferably, the traffic information display restricted area indicating unit displays a boundary between the predetermined area and the remaining area on the on-screen road map image. The traffic information display restricted area indicating unit can further emphasize the display of roads within the predetermined area.

In accordance with another preferred embodiment of the present invention, the traffic information display device further comprises a traffic information display restricted area control unit for varying the predetermined area in which a display of traffic information is restricted according to the speed of the vehicle. Preferably, the traffic information display restricted area control unit varies the predetermined area in such a manner that a part of the remaining area at the front of the vehicle becomes larger than a part of the remaining area at the back of the vehicle with increases in the speed of the vehicle.

In accordance with another preferred embodiment of the present invention, the traffic information display device further comprises a traffic information display restricted area control unit for, when the scale of the on-screen map image is varied, defining the predetermined area in such a manner that the on-screen size of the remaining area in which a display of traffic information is allowed remains invariant regardless of a variation in the scale of the map image.

In accordance with another preferred embodiment of the present invention, the traffic information display device further comprises a starting place setting unit for setting a starting place of the vehicle, a destination setting unit for setting a destination of the vehicle, an optimum route computing unit for computing an optimum route from the starting place to the destination on the basis of the road map data stored in the road map data storing unit, and a traffic information display restricted area setting unit for setting the predetermined area in which a display of traffic information is restricted according to the optimum route.

In accordance with another preferred embodiment of the present invention, the traffic information display device further comprises a unit for detecting roads that are not connected to a road on which the vehicle is moving on the basis of the road map data stored in the road map data storing unit, wherein the traffic information display restricting unit also restricts the display of the roads unconnected to the road on which the vehicle is moving.

In accordance with another preferred embodiment of the present invention, the traffic information display device further comprises a traffic information display restricted area setting unit for setting the predetermined area in such a manner that a part of the remaining area at the front of the vehicle is larger than a part of the remaining area at the back of the vehicle.

In accordance with another preferred embodiment of the present invention, the map display control unit can simultaneously display both a road map image in which the display of the traffic information about the predetermined area is restricted by the traffic information display restricting unit, and another road map image in which all pieces of traffic information about the on-screen map image are displayed, on the screen of the display device.

In accordance with another preferred embodiment of the present invention, in the case of a piece of traffic information to be split over the boundary between the predetermined area and the remaining area, the traffic information display restricting unit displays all of the piece of traffic information without restricting a display of part of the piece of traffic information about the predetermined on-screen area.

In accordance with the present invention, there is provided a method of displaying traffic information, comprising steps of: displaying a road map image associated with an area in the vicinity of a current position of a vehicle on a display screen of a display device on the basis of the current position of the vehicle and road map data; displaying traffic information on the on-screen road map image; and restricting a display of traffic information about a predetermined area of the on-screen map image so as to emphasize traffic information about the remaining area of the on-screen map image including the current position of the vehicle other than the predetermined area.

In accordance with another preferred embodiment of the present invention, in the traffic information emphasizing step, the display of the traffic information about the predetermined area is made quiet as compared with that of the traffic information about the remaining area.

In accordance with another preferred embodiment of the present invention, in the traffic information emphasizing step, the display of the traffic information about the predetermined area is disabled.

In accordance with the present invention, there is provided a medium on which a software program for controlling a display of traffic information by means of a computer is recorded. The program can display a road map image associated with an area in the vicinity of a current position of a vehicle on a display screen of a display device on the basis of the current position of the vehicle and road map data, display traffic information on the on-screen map image, and restrict a display of traffic information about a predetermined area of the on-screen map image so as to emphasize traffic information about the remaining area of the on-screen map image including the current position of the vehicle other than the predetermined area.

In accordance with another preferred embodiment of the present invention, the program can make the display of the traffic information about the predetermined area quiet as compared with that of the traffic information about the remaining area.

In accordance with another preferred embodiment of the present invention, the program can disable the display of the traffic information about the predetermined area.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
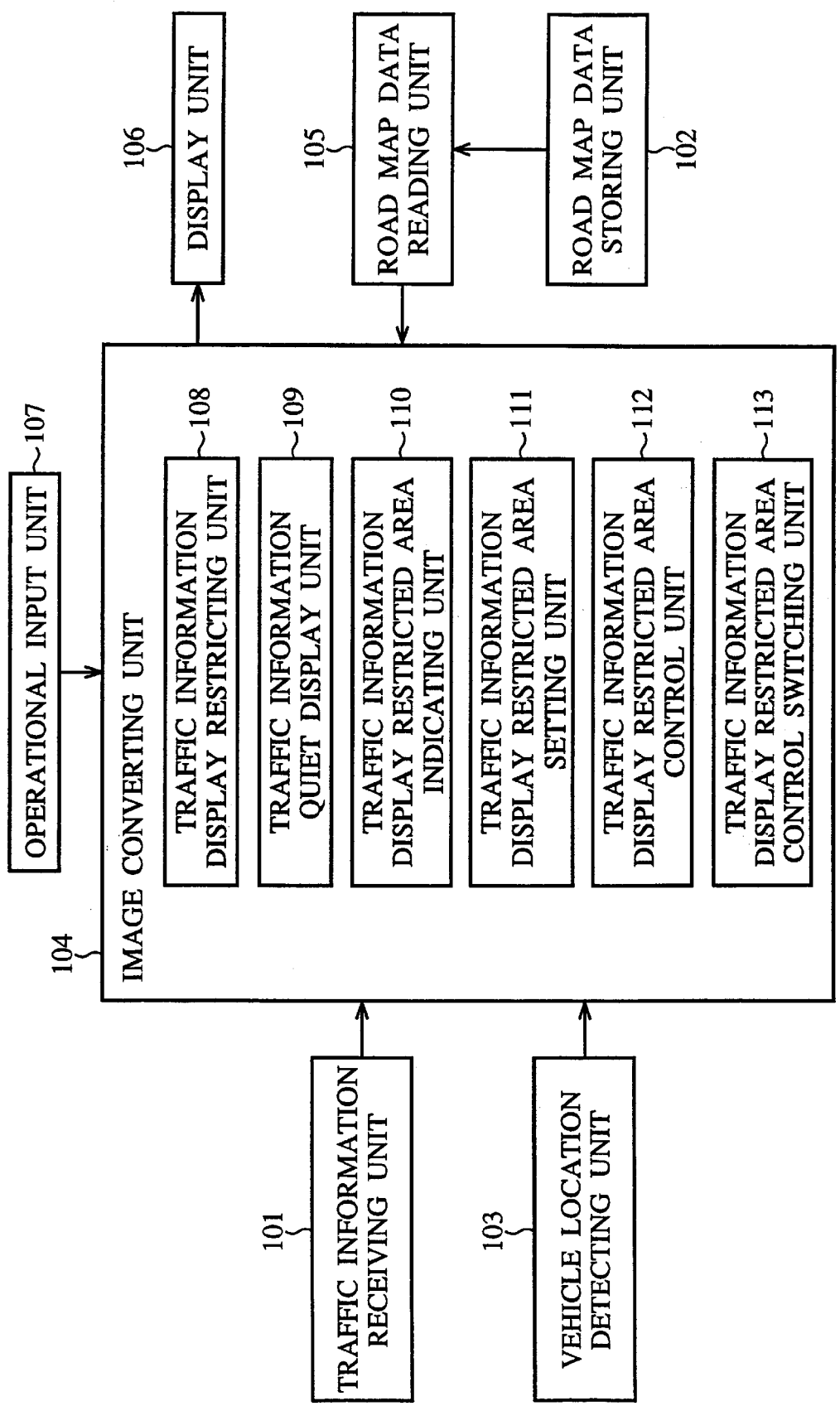
FIG. 1 is a block diagram showing the functional structure of a traffic information display device according to a first embodiment of the present invention.
Figure 2:
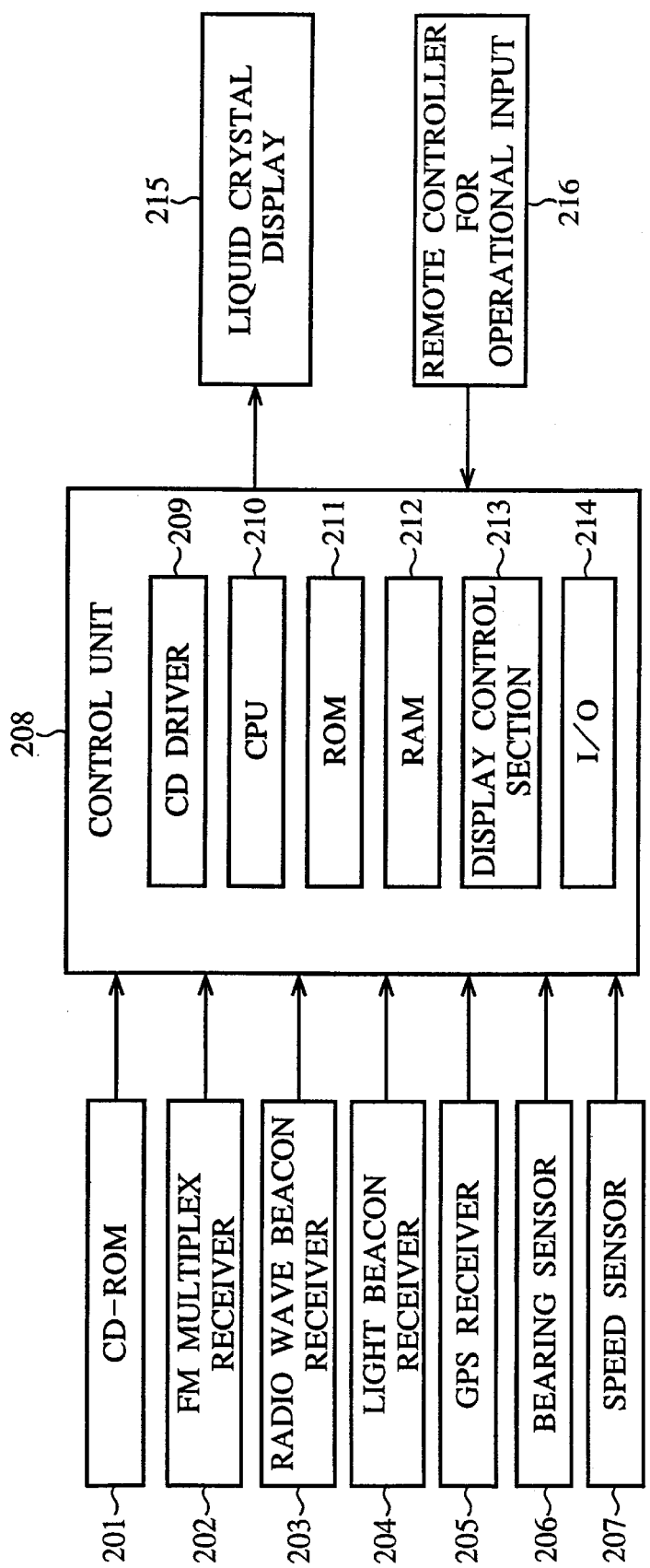
FIG. 2 is a block diagram showing an example of the hardware structure of the traffic information display device according to the first embodiment of the present invention.
Figure 3:
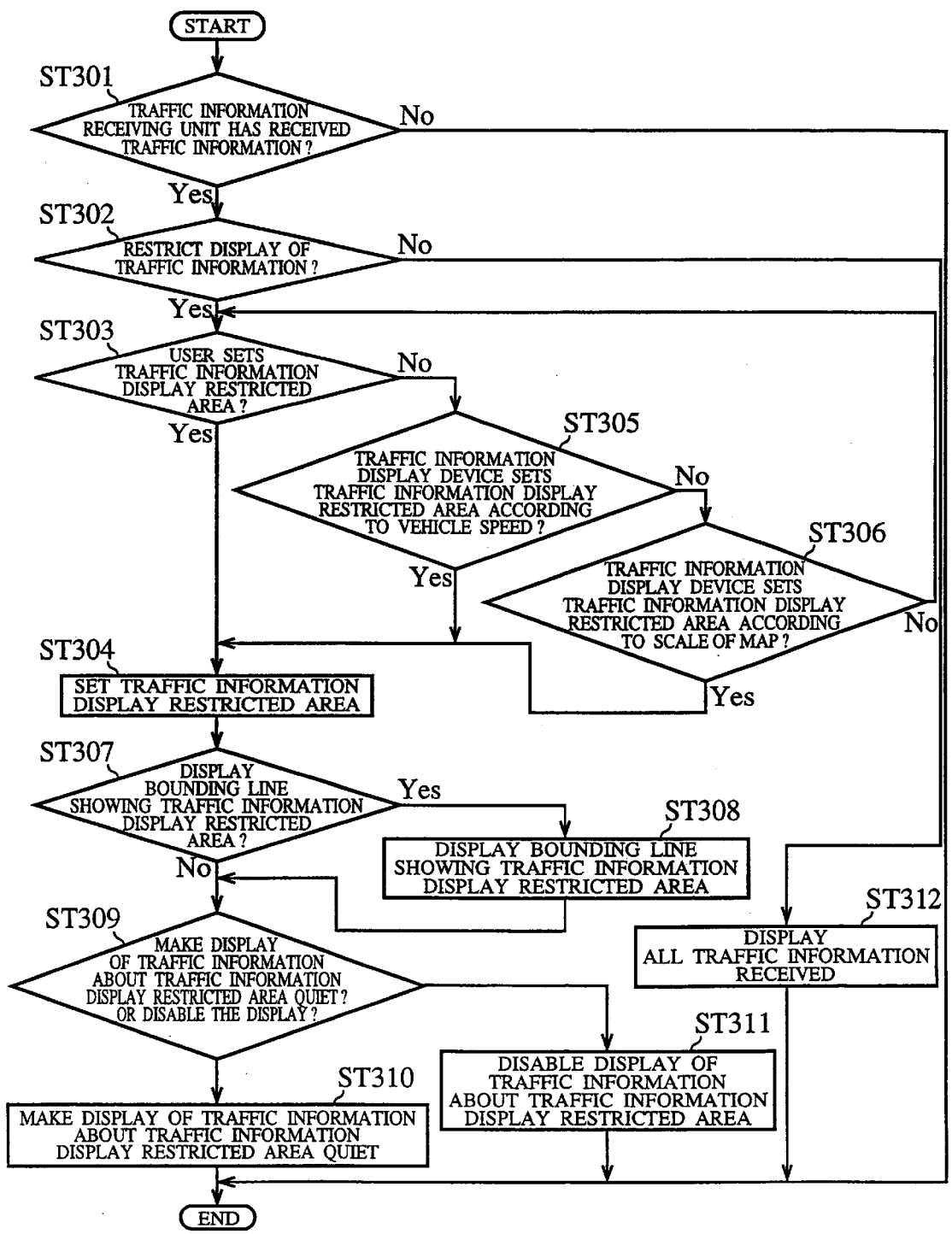
FIG. 3 is a flow diagram showing the flow of processing of the traffic information display device according to the first embodiment of the present invention.

Referring now to FIG. 1, there is illustrated a block diagram of a traffic information display device according to a first embodiment of the present invention. Furthermore, FIG. 2 shows a block diagram showing an example of the hardware structure of the traffic information display device, FIG. 3 shows a flow diagram showing the flow of processing of the traffic information display device, and FIGS. 4 to 13 show examples of the display screen of the traffic information display device.

In FIG. 1, reference numeral 101 denotes a traffic information receiving unit such as an FM receiver for receiving traffic information such as traffic jam information and information about traffic control or regulation transmitted thereto through an FM multiplex broadcasting or the like, or a beacon receiver for receiving road information from beacon transmitters located beside roads, and 102 denotes a road map data storage unit comprising a medium such as a CD-ROM or a memory for storing road map data such as road information and information added to the road information. The road map data storage unit serves to read information from the medium. Preferably, the traffic information display device can be adapted to read a display control program for use therein from a medium such as a CD-ROM or a memory card by means of the road map data storage unit 102 and use the program for an image converting unit 104 described below.

Furthermore, reference numeral 103 denotes a vehicle position detecting unit for detecting the current position of the vehicle by means of a self-contained navigation system using various types of sensors such as a gyro sensor and a speed sensor, or a satellite navigation system using radio waves from GPS satellites.

Reference numeral 104 denotes the image converting unit for converting the road map data stored in the road map data storage unit 102 and the traffic information received by the traffic information receiving unit 101 into a display signal for displaying a road map image including the road map data and the traffic information, 105 denotes a road map data reading unit for reading the road map data specified by the image converting unit 104 on the basis of the current position of the vehicle from the road map data storage unit 102, 106 denotes a display unit for displaying the image including the road map data, the traffic information, and so on according to the display signal from the image converting unit 104, and 107 denotes an operational input unit through which the user can set the destination, choose a menu option, and perform other operations. As mentioned above, the image converting unit 104 can be adapted to execute the display control program for use in the traffic information display device of this embodiment, which can be read out of the road map data storage unit 102 such as a CD-ROM or a memory card.

In addition, reference numeral 108 denotes a traffic information display restricting unit disposed in the image converting unit 104, for turning off (or disabling) a display of traffic information about a predetermined traffic information display restricted area in which a display of traffic information is to be turned off, or making the display of the traffic information quiet, according to the current position of the vehicle detected by the vehicle position detecting unit 103 and the traffic information received by the traffic information receiving unit 101, when displaying the traffic information on the road map image displayed on the display unit 106, and 109 denotes a traffic information quiet display unit for making a display of traffic information about the traffic information display restricted area quiet as compared with its normal display or another display by changing the display color of the traffic information to a quiet color or changing the display form of the traffic information to a quiet form to restrict the display of the traffic information, so that the traffic information display device of this embodiment can reduce the visibility of the display of the traffic information about the traffic information display restricted area and hence provide the display of the traffic information which does not attract the attention of the user.

In this specification, an area on-screen in which a display of traffic information is restricted, i.e., made quiet or disabled is referred to as 'traffic information display restricted area', and an area on-screen in which a display of traffic information is unrestricted, i.e., allowed or enabled is referred to as 'traffic information display unrestricted area'.

Furthermore, reference numeral 110 denotes a traffic information display restricted area indicating unit for displaying a bounding line or the like on the map image displayed on the screen of the display unit 106 so that the user can recognize the traffic information display restricted area in which a display of traffic information is restricted by the traffic information display restricting unit 108, 111 denotes a traffic information display restricted area setting unit through which the user can set up conditions which define the area in which a display of traffic information is restricted, and the shape of the area, i.e., the bounding line of the area, 112 denotes a traffic information display restricted area controlling unit for varying the shape of the bounding line of the area in which a display of traffic information is restricted by the traffic information display restricting unit 108, and controlling the shape of the bounding line according to the setting by the traffic information display restricted area setting unit 111, and 113 denotes a traffic information display restricted area control switching unit for switching between various types of controls by the traffic information display restricted area controlling unit 112.

Next, a description will be made as to an example of the hardware structure of the traffic information display device according to the first embodiment with reference to FIG. 2. In FIG. 2, reference numeral 201 denotes a compact disk read only memory (CD-ROM) which serves as the road map data storage unit 102 shown in FIG. 1, 202 denotes an FM multiplex receiver for receiving an FM multiplex broadcasting, 203 denotes a radio wave beacon receiver, which serves as the traffic information receiving unit 101 shown in FIG. 1, for receiving information furnished by a radio wave beacon, and 204 denotes a light beacon receiver, which serves as the traffic information receiving unit 101 shown in FIG. 1, for receiving information furnished by a light beacon.

Furthermore, reference numeral 205 denotes a GPS receiver for detecting the current position of the vehicle, 206 denotes a bearing sensor for measuring the direction in which the vehicle is headed, and 207 denotes a speed sensor for measuring the speed of the vehicle to furnish a signal with pulses the number of which is determined by the vehicle speed. They serve as the vehicle position detecting unit 103 shown in FIG. 1. In addition, reference numeral 208 denotes a control unit which performs various types of operations and controls for the whole of the traffic information display device of this embodiment. The control unit 208 is comprised of a CD driver 209, a central processing unit (CPU) 210, a read only memory (ROM) 211, a random access memory (RAM) 212, a display control unit 213 for controlling the display operation of a liquid crystal display 215, and an I/O unit 214 for performing input and output from and to the outside of the traffic information display device.

The control unit 208 serves as the image converting unit 104 and the road map data reading unit 105 shown in FIG. 1. The CPU 210, ROM 211, and RAM 212 serve as the traffic information display restricting unit 108, the traffic information quiet display unit 109, the traffic information display restricted area indicating unit 110, the traffic information display restricted area setting unit 111, the traffic information display restricted area controlling unit 112, and the traffic information display restricted area control switching unit 113.

Furthermore, reference numeral 215 denotes a liquid crystal display, which serves as the display unit 106 shown in FIG. 1, for displaying display data from the control unit 208 on the screen thereof, and 216 denotes a remote controller for operational inputs, through which the user can choose one of menu options that provide various types of controls by the controller unit 208 so as to handle the contents displayed on the screen of the liquid crystal display. The remote controller 216 serves as the operational input unit 107.

Next, a description will be made as to the operation of the traffic information display device of the first embodiment with reference to FIG. 3. When the user makes a request for a display of traffic information through the remote controller 216, or when the control unit 208 determines that it produces a display of traffic information, the traffic information display device begins traffic information display processing.

First, the traffic information display device, in step ST301, determines whether or not the traffic information receiving unit 101 has received traffic information. If the traffic information display device determines that the traffic information receiving unit 101 has received traffic information, it advances to step ST302. On the contrary, if the traffic information display device determines that the traffic information receiving unit 101 has not received traffic information yet, it terminates the traffic information display processing.

When the user, in step ST302, makes a request to restrict the display of the traffic information by means of the operational input unit 107, the operational input unit 107 delivers the request to the image converting unit 104. When the image converting unit 104 receives the request to restrict the display of the traffic information, it proceeds to step ST303. On the contrary, when the image converting unit 104 does not receive the request, it proceeds to step ST312.

Alternatively, the control unit 208 can determine whether or not it carries out control processing of the display of the traffic information automatically. The control unit 208 can make the determination on the basis of the amount of the traffic information to be displayed on the screen of the liquid crystal display 215.

In performing step ST303, when the user selects a first mode wherein the user can set the traffic information display restricted area on the on-screen map image in which the display of the traffic information is restricted through the operational input unit 107, the image converting unit 104 advances to step ST304. If the user does not select the first mode, the image converting unit 104 advances to step ST305.

In performing step ST305, when the user selects a second mode wherein the traffic information display restricted area setting unit 111 sets the traffic information display restricted area on the on-screen map image in which the display of the traffic information is restricted according to the speed of the vehicle, through the operational input unit 107, the control unit 208 advances to step ST304. If the user does not select the second mode, the control unit 208 advances to step ST306.

In performing step ST306, when the user selects a third mode wherein the traffic information display restricted area setting unit 111 sets the traffic information display restricted area on the on-screen map image in which the display of the traffic information is restricted according to the scale of the on-screen map image, through the operational input unit 107, the image converting unit 104 advances to step ST304. If the user does not select the third mode, the image converting unit 104 returns to step ST303.

When the user dose not select the third mode in performing step ST306, the image converting unit 104 can alternatively select a fourth mode wherein it can set a default, fixed traffic information display restricted area on the on-screen map image, in which the display of the traffic information is restricted, and then advances to step ST304.

Figure 10:
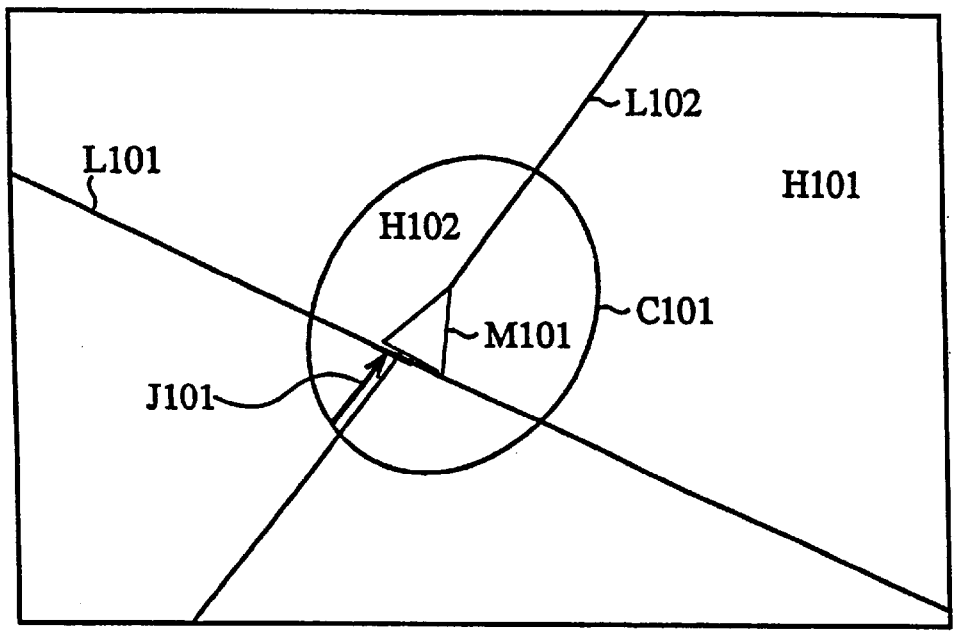
FIG. 10 is an example of the display screen of the display unit of the traffic information display device according to the first embodiment of the present invention.
Figure 11:
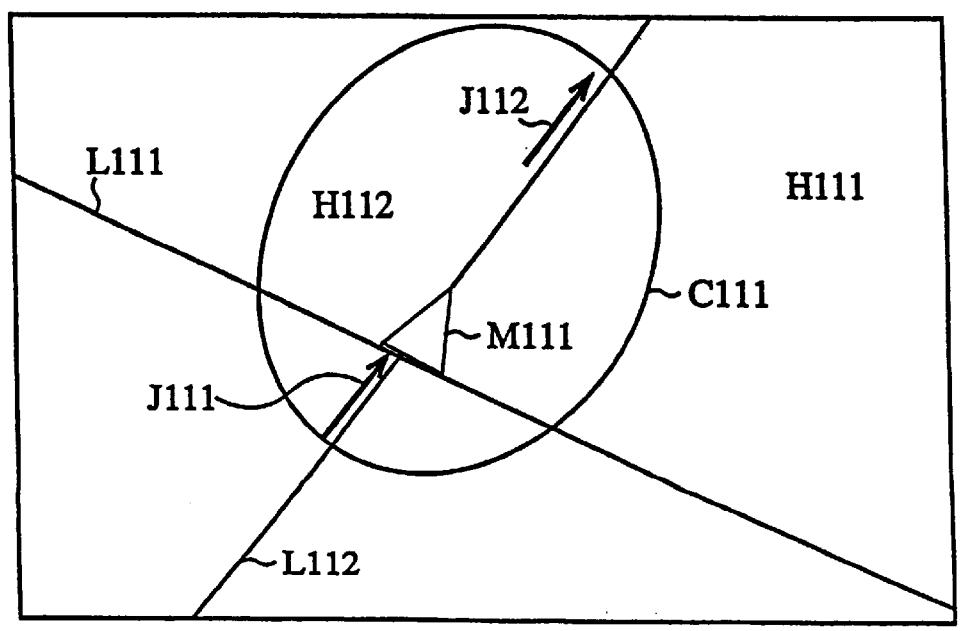
FIG. 11 is an example of the display screen of the display unit of the traffic information display device according to the first embodiment of the present invention.

In step ST304, the traffic information display restricted area setting unit 111 sets the traffic information display restricted area on the on-screen map image according to one setting method selected in step ST303, ST305, or ST306. For example, the traffic information display restricted area can be set as follows. When the user selects the first mode, the user can set the traffic information display restricted area on the on-screen map image by touching for example two points on the display screen of the liquid crystal display 215, which can be detected by a touch sensor. When the user selects the second mode, the traffic information display restricted area setting unit 111 sets the traffic information display restricted area on the on-screen map image in such a manner that when the vehicle is stopped, that is, when the speed of the vehicle is 0 km/h, it draws a circle having a certain radius (which for example corresponds to a distance of 1 km) with the mark showing the current position of the vehicle centered in the circle and then defines the outside of the circle as the traffic information display restricted area, and as the speed of the vehicle increases the traffic information display restricted area setting unit 111 alters the shape of the circle such that a half-round part of the circle at the front of the mark becomes larger than that of the circle at the back of the mark and then defines the outside of the deformed circle shaped like an ellipse as the traffic information display restricted area, as shown in FIGS. 10 and 11 described below.

Figure 12:
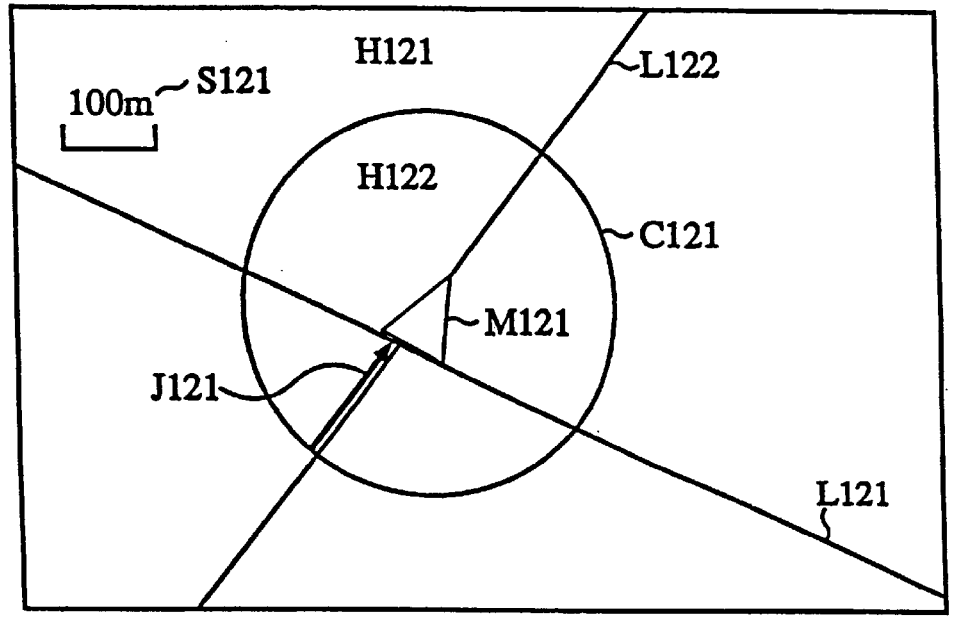
FIG. 12 is an example of the display screen of the display unit of the traffic information display device according to the first embodiment of the present invention.
Figure 13:
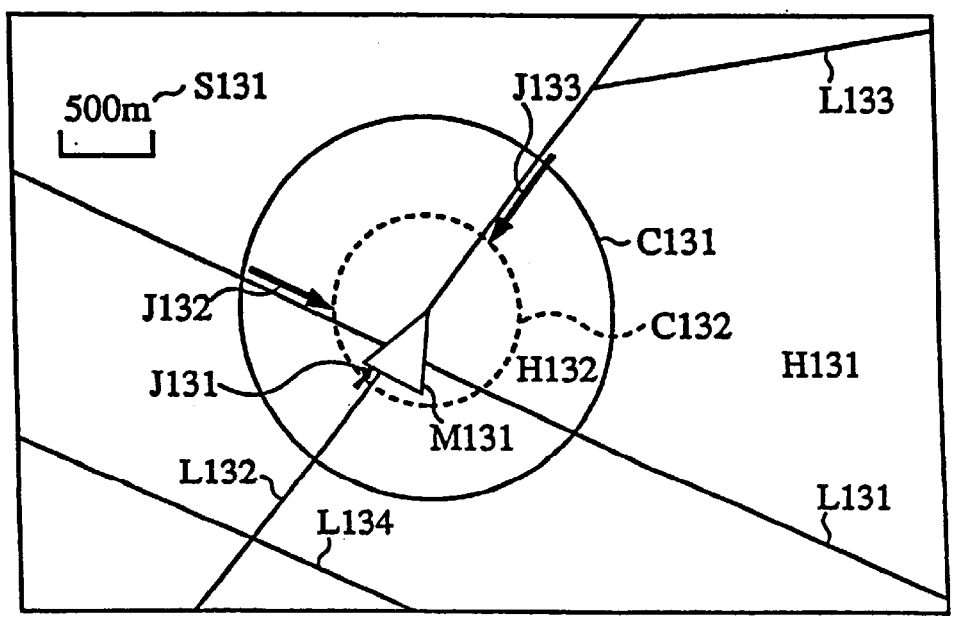
FIG. 13 is an example of the display screen of the display unit of the traffic information display device according to the first embodiment of the present invention.

When the user selects the third mode, the traffic information display restricted area setting unit 111 sets the traffic information display restricted area on the on-screen road map image, in which the display of the traffic information is restricted, in such a manner that it draws a circle having a constant radius with the mark showing the current position of the vehicle centered in the circle and then defines the outside of the circle as the traffic information display restricted area, and it maintains the on-screen size of the traffic information display restricted area even though the scale of the on-screen map image varies, as shown in FIGS. 12 and 13 described below. Therefore, the size of the circle-shaped bounding line such as the radius of the on-screen circle which defines the traffic information display restricted area is not varied with a variation in the scale of the on-screen map image, as can be seen from the traffic information display restricted areas H121 shown in FIG. 12 and H131 shown in FIG. 13.

When the user, in step ST307, makes a request to display the bounding line between the traffic information display restricted area set in step ST304 and the remaining area on the display screen, i.e., the traffic information display unrestricted area in which a display of traffic information is enabled, through the operational input unit 107, the image converting unit 104 advances to step ST308. On the contrary, when the user, in step ST307, does not make the above request, the control unit 208 advances to step ST309.

Figure 4:
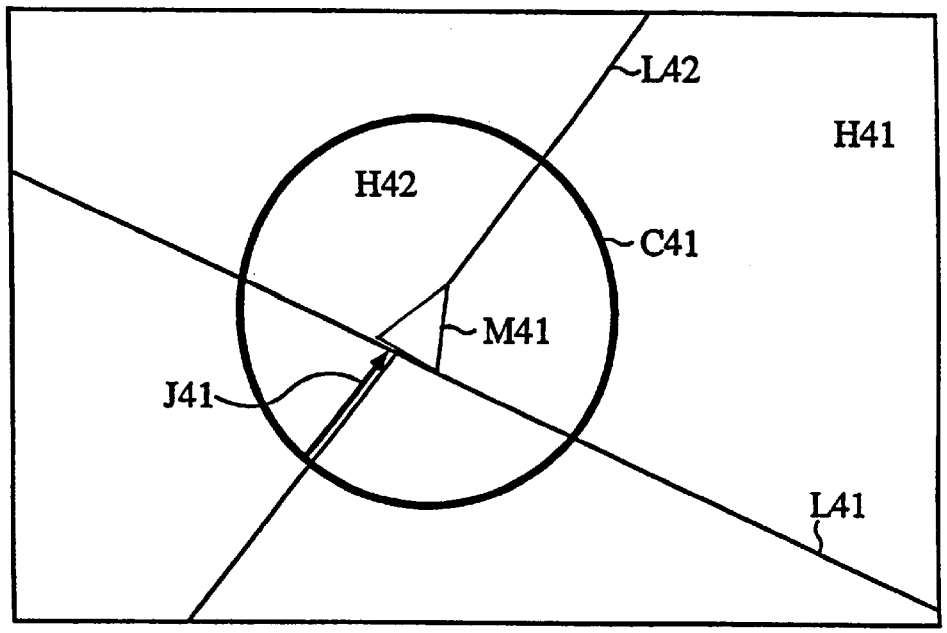
FIG. 4 is an example of the display screen of the display unit of the traffic information display device according to the first embodiment of the present invention.

In performing step ST308, the traffic information display restricted area indicating unit 110 draws a bounding line having a predetermined width between the traffic information display restricted area and the remaining area which have been defined in step ST304, for example, a circle-shaped bounding line C41 as shown in FIG. 4.

Alternatively, the traffic information display restricted area indicating unit 110 can, for example, crosshatch the traffic information display restricted area in order to make a distinction between the traffic information display restricted area and the remaining area in which a display of traffic information is allowed.

Then, the user selects either a first display mode in which a display of traffic information about the traffic information display restricted area is made quiet as compared with that of traffic information about the remaining area or a second display mode in which a display of traffic information about the traffic information display restricted area is disabled, through the operational input unit 107, in step ST309. When the user selects the first display mode in which a display of traffic information about the traffic information display restricted area is made quiet as compared with that of traffic information about the remaining area, the image converting unit 104 advances to step ST310. On the contrary, when the user selects the second display mode in which a display of traffic information about the traffic information display restricted area is disabled, the image converting unit 104 advances to step ST311.

In performing step ST310, the image converting unit 104 displays all the traffic information about the on-screen map image in such a manner that the traffic information about the traffic information display restricted area is made quiet as compared with the traffic information about the remaining area, and then terminates the traffic information display restricting processing.

In performing step ST311, the image converting unit 104 displays only the traffic information about the remaining area other than the traffic information display restricted area, and then terminates the traffic information display restricting processing.

In this manner, the traffic information display device according to this embodiment makes it possible to display traffic information about an on-screen road map image without preventing the user from recognizing needed information so that the on-screen traffic information does not make the display screen indistinct.

Next, a description will be made as to examples of the display screen of the traffic information display device according to this embodiment with reference to FIGS. 4 to 13.

Figure 5:
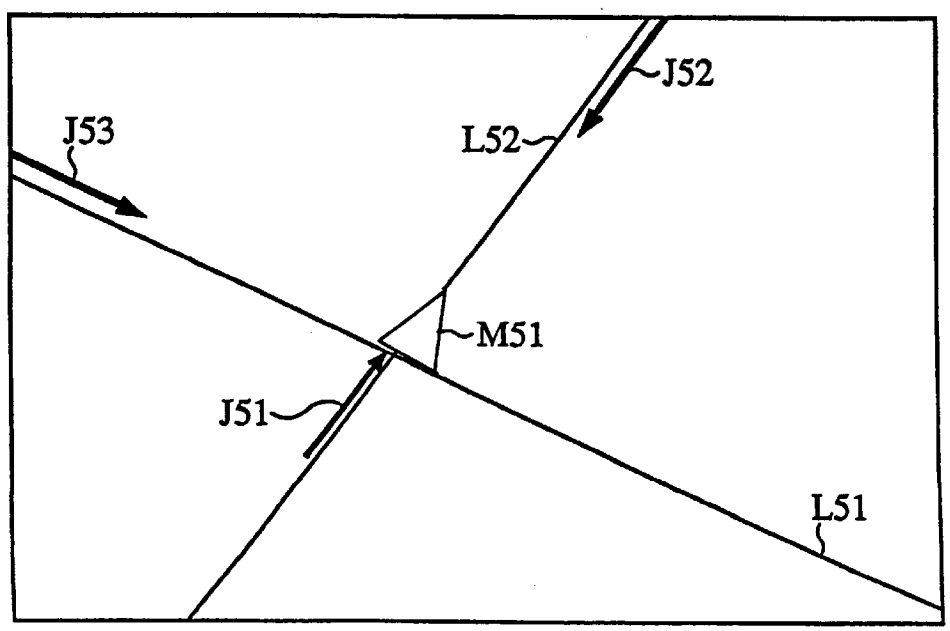
FIG. 5 is an example of the display screen of the display unit of the traffic information display device according to the first embodiment of the present invention.

FIG. 4 shows an example of the display screen on which only the traffic information about the remaining area other than the traffic information display restricted area is displayed, and FIG. 5 shows an example of the display screen on which all the traffic information about the on-screen map image is displayed.

In FIG. 4, reference character M41 denotes a mark indicating the current position of the vehicle, and C41 denotes a circle-shaped bounding line having a predetermined width and a certain radius corresponding to a predetermined distance, and showing that the outside of the bounding line is the traffic information display restricted area in which a display of traffic information is disabled. The mark M41 is centered in the circle-shaped bounding line C41. Furthermore, each of reference characters L41 and L42 denotes a road, J41 denotes a congestion indicating arrow showing a congested zone, which is located within the remaining area other than the traffic information display restricted area, of the road L42 and the extent of the traffic congestion, H41 denotes the traffic information display restricted area, and H42 denotes the traffic information display unrestricted area in which a display of traffic information is enabled. In FIG. 5, reference character M51 denotes a mark indicating the current position of the vehicle, each of L51 and L52 denotes a road, and each of J51, J52, and J53 denotes a congestion indicating arrow showing a congested zone of the road L51 or L 52 and the extent of the traffic congestion.

As shown in FIG. 4, the display of the traffic information about the traffic information display restricted area H41 is disabled with the result that the traffic information about the remaining area, i.e., the traffic information display unrestricted area H42 is emphasized.

Preferably, the circle-shaped traffic information display unrestricted area H42 can be deformed such that part of the area H42 at the front of the mark M41 is larger than part of the area H42 at the back of the mark M41, so that the mark M41 is located out of the center of the deformed traffic information display unrestricted area H42, toward the backward part of the area.

In FIG. 4, only the congestion indicating line J41 which corresponds to the congestion indicating line J51 shown in FIG. 5 is displayed while the congestion indicating lines which correspond to the other congestion indicating lines J52 and J53 shown in FIG. 5 are not displayed. Since the display of unnecessary traffic information about the area that is far away from the vehicle is thus disabled so as to emphasize the traffic information about the area in the vicinity of the vehicle, the user can easily recognize the needed traffic information about the area in the vicinity of the vehicle, such as road signs, and landmarks.

Although the traffic information which corresponds to the congestion indicating arrow J51 shown in FIG. 5 is split across the boundary between the traffic information display restricted area H41 and the traffic information display unrestricted area H42, FIG. 4 shows that only part of the traffic information about the traffic information display unrestricted area H42 is displayed as the congestion indicating arrow J41 while the remaining part of the traffic information about the traffic information display restricted area H41 is not displayed.

Figure 6:
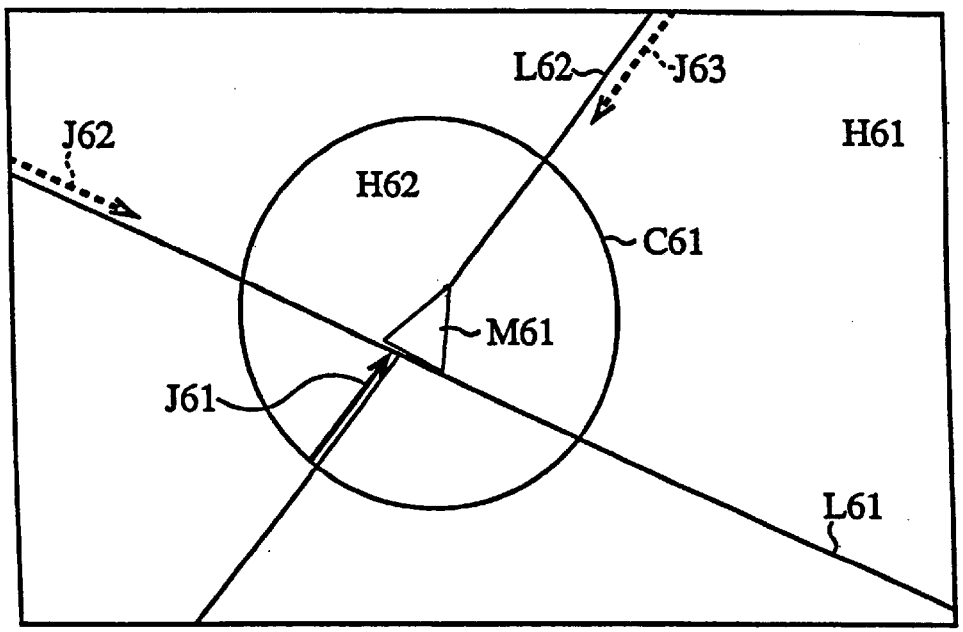
FIG. 6 is an example of the display screen of the display unit of the traffic information display device according to the first embodiment of the present invention.
Figure 7:
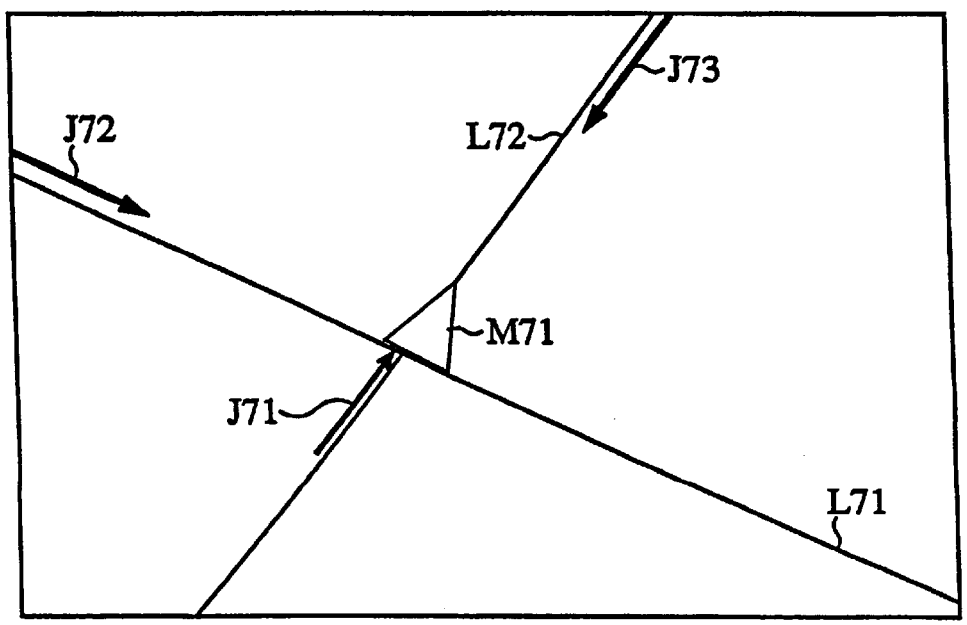
FIG. 7 is an example of the display screen of the display unit of the traffic information display device according to the first embodiment of the present invention.

FIG. 6 shows an example of the display screen on which a display of traffic information about the traffic information display restricted area is made quiet as compared with that of traffic information about the traffic information display unrestricted area, and FIG. 7 shows an example of the display screen, which corresponds to the example of FIG. 6, in the case where the traffic information display restricted mode is cancelled.

In FIG. 6, reference character M61 denotes a mark indicating the current position of the vehicle, and C61 denotes a circle-shaped bounding line having a certain radius corresponding to a predetermined distance, and showing that the outside of the bounding line is the traffic information display restricted area in which a display of traffic information is restricted. The mark M61 is centered in the circle-shaped bounding line C61. Furthermore, each of reference characters L61 and L62 denotes a road, J61 denotes a congestion indicating arrow showing a congested zone, which is located within the remaining area other than the traffic information display restricted area, of the road L62 and the extent of the traffic congestion, each of J62 and J63 denotes a congestion indicating arrow showing a congested zone of the roads K61 or L62 and the extent of the traffic congestion, H61 denotes the traffic information display restricted area, and H62 denotes the traffic information display unrestricted area in which a display of traffic information is enabled. In FIG. 7, reference character M71 denotes a mark indicating the current position of the vehicle, each of L71 and L72 denotes a road, and each of J71, J72, and J73 denotes a congestion indicating arrow showing a congested zone of the road L71 or L72 and the extent of the traffic congestion.

As shown in FIG. 6, the display of the traffic information about the traffic information display restricted area H61 is restricted with the result that the traffic information about the remaining area, i.e., the traffic information display unrestricted area H62 is emphasized.

Preferably, the circle-shaped traffic information display unrestricted area H62 can be deformed such that part of the area H62 at the front of the mark M61 is larger than part of the area H62 at the back of the mark M61, so that the mark M61 can be located out of the center of the deformed traffic information display unrestricted area H62, toward the backward part of the area.

In FIG. 6, only the congestion indicating line J61 which corresponds to the congestion indicating line J71 shown in FIG. 7 is displayed while the displays of the congestion indicating lines which correspond to the other congestion indicating lines J72 and J73 shown in FIG. 7 are restricted so that they are made quiet as compared with their normal displays. Thus, the traffic information display device of this embodiment can produce a display screen, as shown in FIG. 6, on which the display of unnecessary traffic information about the area that is far away from the vehicle is restricted or made quiet so as to emphasize the traffic information about the area in the vicinity of the vehicle and therefore provide the user with the needed traffic information surely. Accordingly, the user can easily recognize the needed traffic information about the area in the vicinity of the vehicle, such as road signs, and landmarks.

In FIG. 6, although the piece of traffic information which corresponds to the congestion indicating arrow J71 shown in FIG. 7 is split across the boundary between the traffic information display restricted area H61 and the traffic information display unrestricted area H62, the display of the part of the traffic information about the traffic information display restricted area H61 is not restricted, and therefore both of the parts of the traffic information about the traffic information display restricted area H61 and traffic information display unrestricted area H62 are displayed as the congestion indicating arrow J61.

As shown in FIGS. 4 and 5, for a piece of traffic information to be displayed on the on-screen map image that is split across the boundary between the traffic information display restricted area and the traffic information display unrestricted area, the traffic information display device according to this embodiment displays only part of the traffic information about the traffic information display unrestricted area while disabling the display of part of the traffic information about the traffic information display restricted area, thereby providing the user with minimum and needed traffic information. On the contrary, for a piece of traffic information part of which is to be located within the traffic information display restricted area, the traffic information display device according to the above-mentioned variant of the first embodiment can also display the part of the traffic information about the traffic information display restricted area to completely display all the piece of traffic information, as shown in FIG. 6. Accordingly, this variant makes it possible to prevent only part of a piece of traffic information that is split across the boundary between the traffic information display restricted area and the traffic information display unrestricted area from being displayed and hence provide the user with all of the piece of traffic information, so that the user can recognize the traffic information more accurately.

Figure 8:
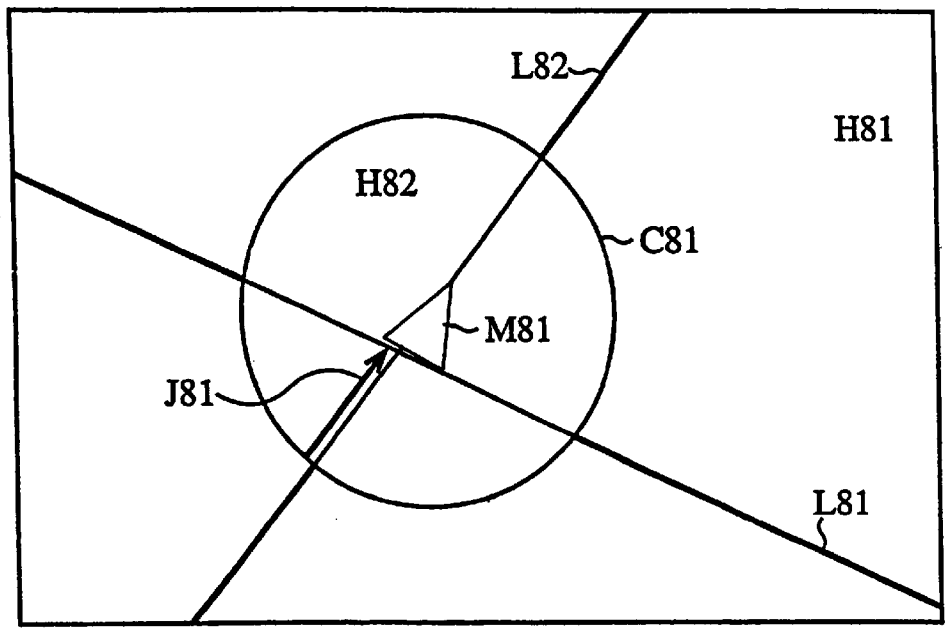
FIG. 8 is an example of the display screen of the display unit of the traffic information display device according to the first embodiment of the present invention.

Numerous other variants may be made in the exemplary embodiment mentioned above. Referring next to FIG. 8, there is illustrated an example of the display screen on which the display of information on roads other than traffic information about the traffic information display restricted area is emphasized. In FIG. 8, reference character M81 denotes a mark indicating the current position of the vehicle, and C81 denotes a circle-shaped bounding line having a certain radius corresponding to a predetermined distance, and showing that the outside of the bounding line is the traffic information display restricted area in which a display of traffic information is disabled. The mark M81 is centered in the circle-shaped bounding line C81. Furthermore, each of reference characters L81 and L82 denotes a road, J81 denotes a congestion indicating arrow showing a congested zone, which is located within the remaining area other than the traffic information display restricted area, of the road L82 and the extent of the traffic congestion, H81 denotes the traffic information display restricted area, and H82 denotes the traffic information display unrestricted area in which a display of traffic information is enabled.

As can be seen from FIG. 8, the bounding line C81 showing the traffic information display restricted area makes it easy for the user to make a distinction between the traffic information display restricted area H81 and the traffic information display unrestricted area H82 displayed on the screen of the display device. In addition, the emphasized display of the roads L81 and L82 within the traffic information display restricted area H81 further makes it easy for the user to make a distinction between the traffic information display restricted area H81 and the traffic information display unrestricted area H82 displayed on the screen of the display device.

Figure 9:
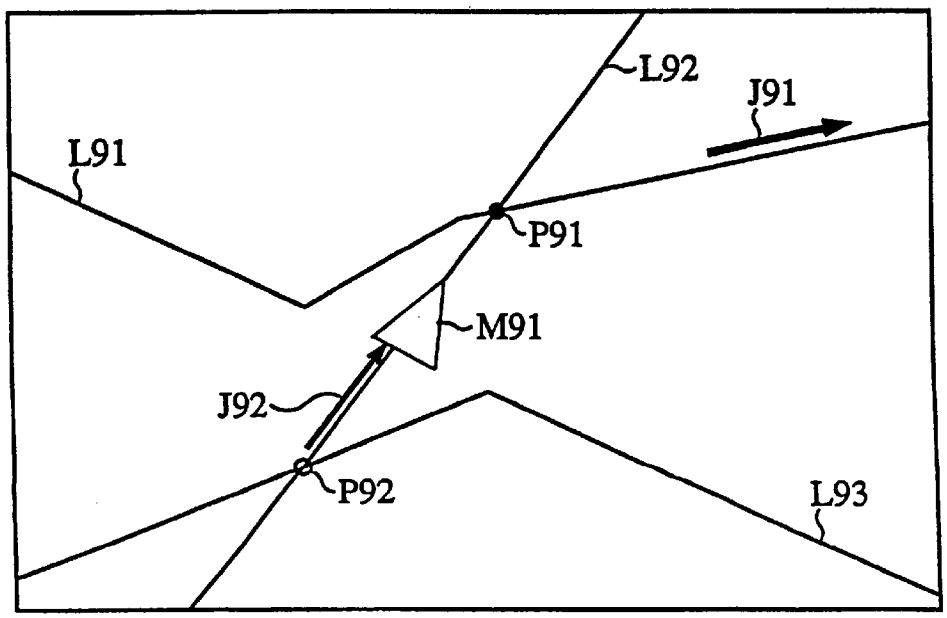
FIG. 9 is an example of the display screen of the display unit of the traffic information display device according to the first embodiment of the present invention.

Referring next to FIG. 9, there is illustrated an example of the display screen on which only traffic information about roads connected to a road on which the vehicle is moving is displayed. In FIG. 9, reference character M91 denotes a mark indicating the current position of the vehicle, each of L91, L92 and L93 denotes a road, J91 denotes a congestion indicating arrow showing a congested zone, which is located within the remaining area other than the traffic information display restricted area, of the road L91 and the extent of the traffic congestion, and J92 denotes a congestion indicating arrow showing a congested zone, which is located within the remaining area other than the traffic information display restricted area, of the road L92 and the extent of the traffic congestion. Furthermore, each of reference characters P91 and P92 denotes a point of intersection of two roads. The point P91 is a point of intersection of the roads L91 and L92 and is drawn as a filled-in dot showing that the vehicle can move between the roads via the intersection, that is, the roads are connected to each other via the point. The point P92 is a point of intersection of the roads L92 and L93 and is drawn as an open dot showing that the vehicle cannot move between the roads via the intersection, that is, the roads are unconnected to each other via the point. The point P92 is for example a point on the on-screen map image at which a highway road and a road passing under the highway road between which the vehicle cannot move cross each other. The point P91 is for example a point via which the vehicle can move to another road, such as an intersection, or a junction of three roads.

As can be seen from FIG. 9, the congestion indicating arrow J91 which is a piece of traffic information about the road L91 connected to the road L92 on which the vehicle is moving is displayed while traffic information about the road L93 unconnected to the road L92 on which the vehicle is moving is not displayed. Thus, the traffic information display device according to this variant of the first embodiment does not display unnecessary traffic information, i.e., the traffic information about roads unconnected to the road on which the vehicle is moving (i.e., roads to which the vehicle cannot move) on the on-screen map image, thereby preventing such the unnecessary traffic information from being displayed on the display screen.

Referring next to FIG. 10, there is illustrated an example of the display screen on which the traffic information display restricted area in the case where the vehicle is moving at a speed of 30 km/h is displayed, and FIG. 11 shows an example of the display screen on which the traffic information display restricted area in the case where the vehicle is moving at a speed of 60 km/h is displayed.

In FIG. 10, reference character M101 denotes a mark indicating the current position of the vehicle, and C101 denotes a bounding line for the vehicle speed of 30 km/h, showing that the outside of an area enclosed by the bounding line is the traffic information display restricted area in which a display of traffic information is disabled. Furthermore, each of reference characters L101 and L102 denotes a road, J101 denotes a congestion indicating arrow showing a congested zone, which is located within the remaining area other than the traffic information display restricted area, of the road L102 and the extent of the traffic congestion, H101 denotes the traffic information display restricted area, and H102 denotes the remaining area in which a display of traffic information is not restricted. The traffic information display unrestricted area H102 is defined in such a manner that part of the traffic information display unrestricted area H102 at the front of the vehicle is larger than part of the traffic information display unrestricted area H102 at the back of the vehicle.

In FIG. 11, reference character M111 denotes a mark indicating the current position of the vehicle, and C111 denotes a bounding line for the vehicle speed of 60 km/h, showing that the outside of an area enclosed by the bounding line is the traffic information display restricted area in which a display of traffic information is disabled.

Furthermore, each of reference characters L111 and L112 denotes a road, each of J111 and J112 denotes a congestion indicating arrow showing a congested zone of the road L112 and the extent of the traffic congestion, H111 denotes the traffic information display restricted area, and H112 denotes the remaining area in which a display of traffic information is not restricted. The traffic information display unrestricted area H112 is defined in such a manner that part of the traffic information display unrestricted area H112 at the front of the vehicle is larger than part of the traffic information display unrestricted area H112 at the back of the vehicle, like the traffic information display unrestricted area H102 for the vehicle speed of 30 km/h shown in FIG. 10.

As can be seen from the traffic information display restricted area H101 shown in FIG. 10 in the case where the speed of the vehicle is 30 km/h and the traffic information display restricted area H101 shown in FIG. 11 in the case where the speed of the vehicle is 60 km/h, part of the traffic information display restricted area at the front of the vehicle becomes smaller than part of the traffic information display restricted area at the back of the vehicle with increases in the speed of the vehicle. That is, part of the area in which a display of traffic information is enabled at the front of the vehicle becomes larger than part of the area at the back of the vehicle with increases in the speed of the vehicle. Accordingly, the user can get traffic information about a larger area at the front of the vehicle with increases in the speed of the vehicle so as to be able to efficiently recognize traffic information about a faraway area at the front of the vehicle at an earlier time as compared with the case where the speed of the vehicle is slow.

FIG. 12 shows an example of the display screen on which the bounding line defining the traffic information display restricted area for a 10,000:1 scale on-screen map image is displayed, and FIG. 13 shows an example of the display screen on which the bounding line defining the traffic information display restricted area for a 50,000:1 scale on-screen map image is displayed.

In FIG. 12, reference character M121 denotes a mark indicating the current position of the vehicle, S121 denotes the scale of the on-screen map image, and C121 denotes the bounding line for the 10,000:1 scale on-screen map image, showing that the outside of an area enclosed by the bounding line is the traffic information display restricted area in which a display of traffic information is disabled. The mark M121 is centered in the circle-shaped bounding line C121. Furthermore, each of reference character L121 and L122 denotes a road, J121 denotes a congestion indicating arrow showing a congested zone, which is located within the remaining area other than the traffic information display restricted area, of the road L122 and the extent of the traffic congestion, H121 denotes the traffic information display restricted area, and H122 denotes the traffic information display unrestricted area in which a display of traffic information is enabled.

In FIG. 13, reference character M131 denotes a mark indicating the current position of the vehicle, S131 denotes the scale of the on-screen map image, and C131 denotes the bounding line for the 50,000:1 scale on-screen map image, showing that the outside of an area enclosed by the bounding line is the traffic information display restricted area in which a display of traffic information is disabled. The mark M131 is centered in the circle-shaped bounding line C131. Furthermore, each of reference character L131, L132, L133, and L134 denotes a road, each of J131, J132, and J132 denotes a congestion indicating arrow showing a congested zone of the road L131 or L132 and the extent of the traffic congestion, H131 denotes the traffic information display restricted area, H132 denotes the remaining area in which a display of traffic information is not restricted, and C132 denotes a dashed line which corresponds to the bounding line C121 shown in FIG. 12, which is not displayed really on the screen of the display device and is merely illustrated for explanation.

As shown in FIGS. 12 and 13, even though the scale of the on-screen map image is varied, the traffic information display restricted area setting unit 111 of this variant defines the traffic information display restricted area in which a display of traffic information is restricted in such a manner that the on-screen size of the traffic information display restricted area is maintained. Therefore, a decrease in the scale of the on-screen map image from FIG. 12 to FIG. 13 does not cause a variation in the on-screen size of the traffic information display restricted area. However, since the scale is varied, the traffic information display unrestricted area H122 on the map image shown in FIG. 12 corresponds to the area enclosed by the dashed line C132 shown in FIG. 13 which is within and smaller than the traffic information display unrestricted area H132 of FIG. 13, and therefore the amount of traffic information displayed within the traffic information display unrestricted area H132 in FIG. 13 can be larger than that within the traffic information display unrestricted area H122 in FIG. 12. On the other hand, since the lengths of congestion indicating arrows such as the ones J121 and J131 vary with a variation in the scale of the on-screen map image, the visibility of the display screen is not varied with a variation of the scale of the on-screen map image, as can be seen from a comparison between FIGS. 12 and 13.

As previously explained, since the traffic information display device according to the first embodiment makes it possible to disable or make a display of traffic information other than needed traffic information quiet as compared with a display of the needed traffic information when receiving a large amount of traffic information, the user can easily recognize the needed traffic information without being puzzled by unnecessary traffic information.

Furthermore, a display for making a distinction between the traffic information display restricted area and the traffic information display unrestricted area such as a bounding line makes it easy for the user to determine whether there does not exist traffic information or a display of traffic information is restricted.

Further variants may be made in the exemplary embodiment mentioned above. For example, a display of traffic information about the traffic information display restricted area can be made quiet by changing the display color and luminance of the traffic information display restricted area. Instead of defining the outside of a circle-shaped bounding line having a predetermined radius corresponding to a certain distance as the traffic information display restricted area while positioning the mark showing the current position of the vehicle at the center of the circle, the traffic information display restricted area setting unit 111 can define an area in the vicinity of the destination, an area in the vicinity of places through which the vehicle will go to the destination, or an area in the vicinity of a predetermined place, as the traffic information display restricted area.

Furthermore, the traffic information display restricting unit 108 can restrict a display of traffic information such as information about suspension of traffic, road repairing or road building, or warning, instead of restricting a display of traffic jam information.

In addition, instead of the solid bounding line showing the traffic information display restricted area, the traffic information display restricted area indicating unit 110 can draw another type of line such as a dotted line, or a dashed line as the bounding line.

Preferably, the traffic information display restricted area control switching unit 113 can be adapted to switch the traffic information display restricted area to a state in which a display of traffic information is enabled, and the traffic information display unrestricted area to a state in which a display of traffic information is restricted when the user chooses a menu option that causes the switching operation through a touch switch or the like disposed on the display screen.

Figure 14:
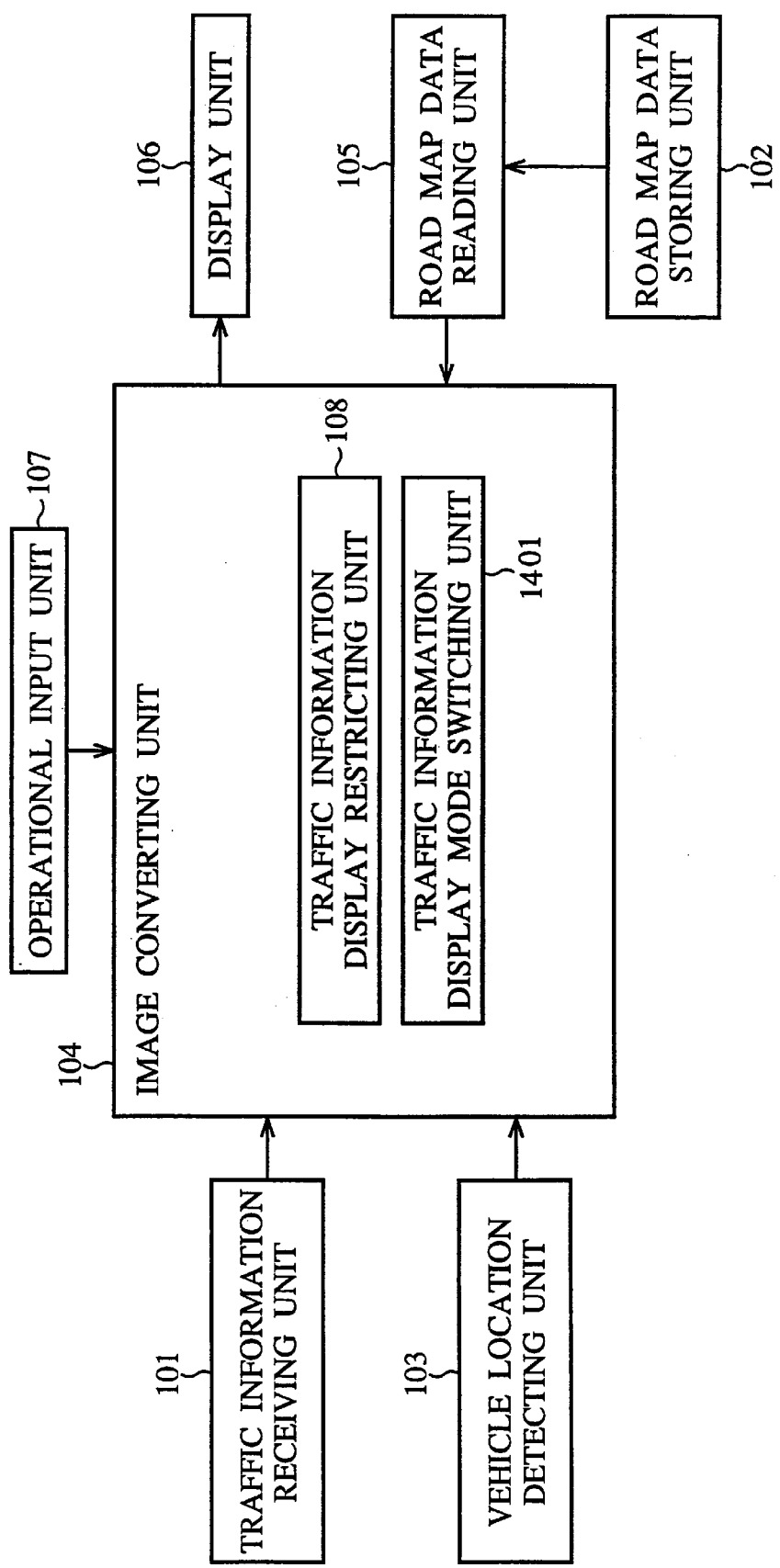
FIG. 14 is a block diagram showing the functional structure of a traffic information display device according to a second embodiment of the present invention.
Figure 15:
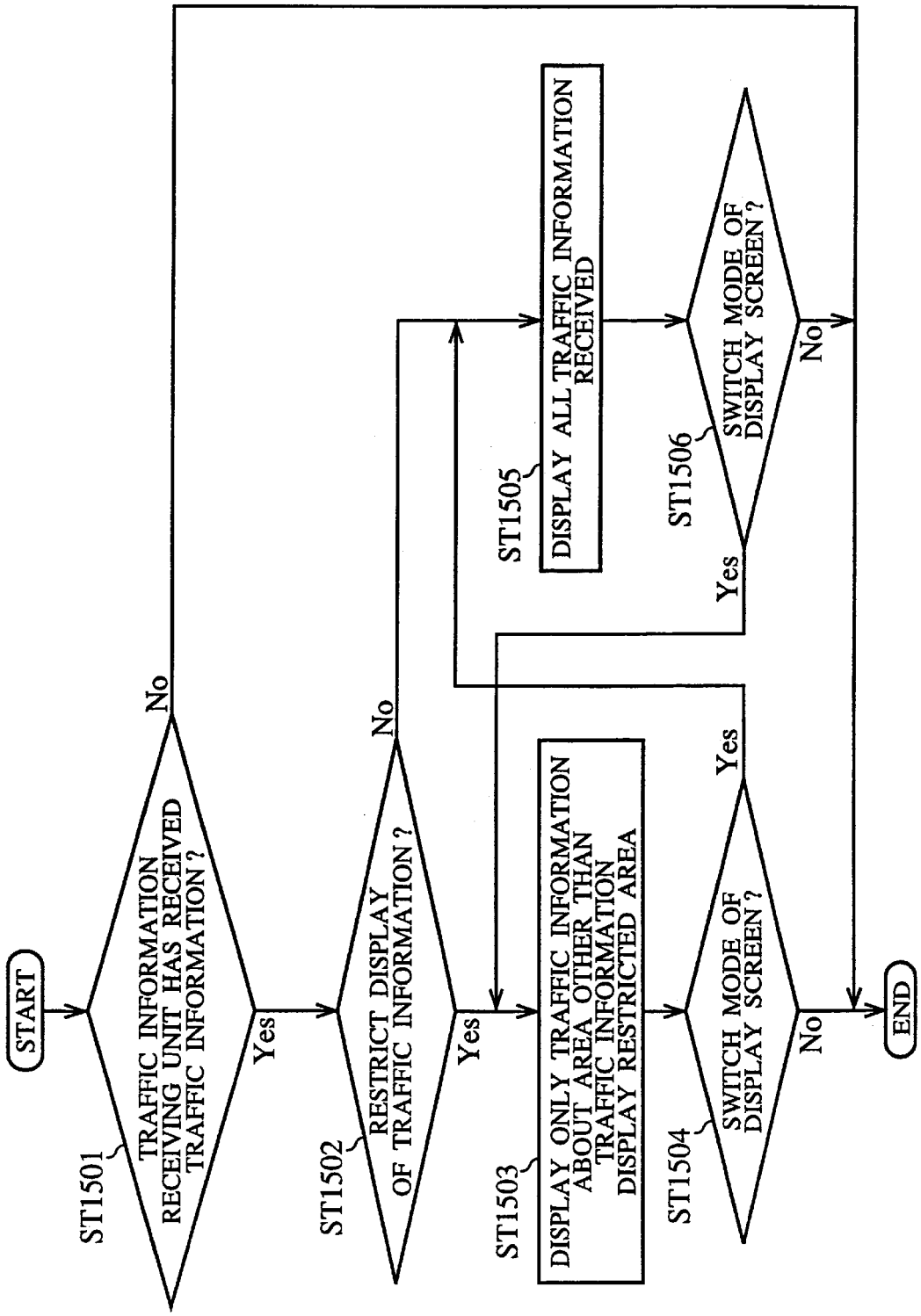
FIG. 15 is a flow diagram showing the flow of processing of the traffic information display device according to the second embodiment of the present invention.
Figure 16:
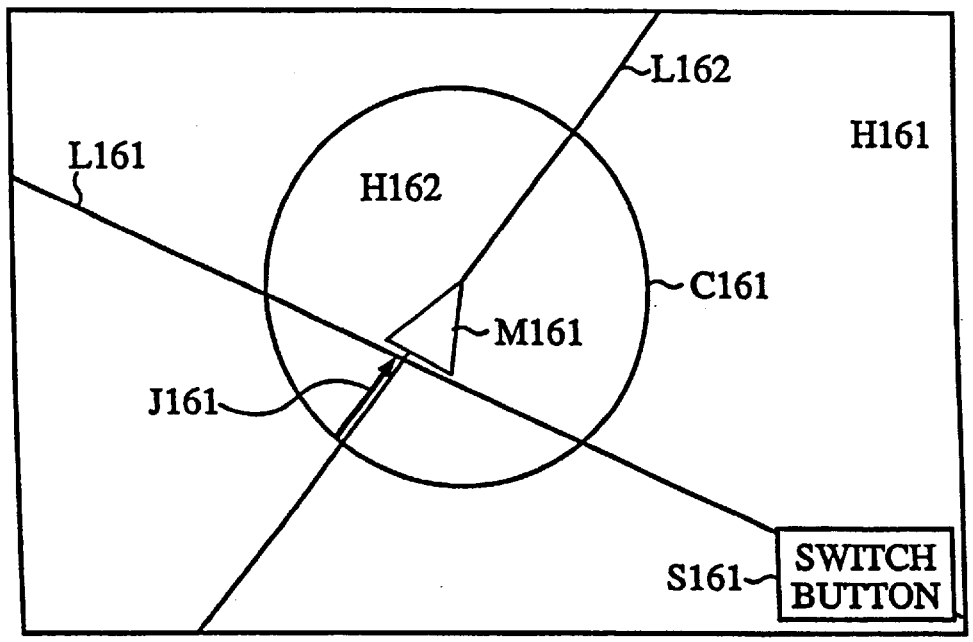
FIG. 16 is an example of the display screen of the display unit of the traffic information display device according to the second embodiment of the present invention.
Figure 17:
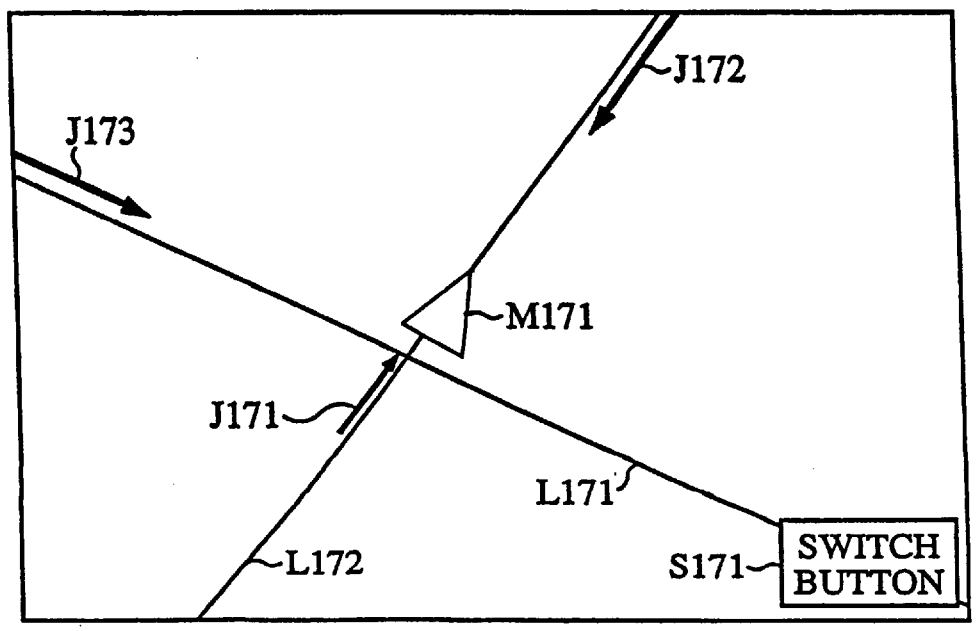
FIG. 17 is an example of the display screen of the display unit of the traffic information display device according to the second embodiment of the present invention.

Referring now to FIG. 14, there is illustrated a block diagram of a traffic information display device according to a second embodiment of the present invention. Furthermore, FIG. 15 shows a flow diagram showing the flow of processing of the traffic information display device, FIG. 16 shows an example of the display screen on which a display of traffic information is restricted, and FIG. 17 shows an example of the display screen on which all traffic information about an on-screen road map image is displayed without restricting the display of the traffic information.

The traffic information display restricting unit 108 according to the above-mentioned first embodiment determines whether or not it restricts a display of traffic information, in performing step ST302 shown in FIG. 3. By contrast, the image converting unit 104 according to the second embodiment is adapted to switch between a traffic information display restricted screen mode in which a display of traffic information about the traffic information display restricted area is restricted and a traffic information display unrestricted screen mode in which all traffic information about the on-screen map image is displayed by means of a traffic information display mode switching unit 1401.

As shown in FIG. 14, the traffic information display mode switching unit 1401 disposed in the image converting unit 104 can switch the display screen mode of the display unit 106 between the traffic information display restricted screen mode in which a display of part of traffic information is restricted by the traffic information display restricting unit 108 and the traffic information display unrestricted screen mode in which the traffic information display restricting unit 108 is disabled and all traffic information about the on-screen map image is displayed. Furthermore, the traffic information display mode switching unit 1401 can be implemented via at least the CPU 210, ROM 211, and RAM 212 as shown in FIG. 2.

In FIG. 14, the same or like components as those in the above-mentioned first embodiment shown in FIG. 1 are designated by the same reference numerals, and therefore the description about the components will be omitted hereinafter. Furthermore, the hardware structure of the traffic information display device of the second embodiment is the same as that of the traffic information display device of the first embodiment, and therefore the description about the hardware structure will be omitted.

In FIG. 16, reference character M161 denotes a mark indicating the current position of the vehicle, and C161 denotes a circle-shaped bounding line showing that the outside of an area enclosed by the bounding line is the traffic information display restricted area in which a display of traffic information is restricted. The mark M161 is centered in the circle-shaped bounding line C161. Furthermore, S161 denotes a switch for switching the display screen to the traffic information display unrestricted screen mode as shown in FIG. 17, each of L161 and L162 denotes a road, J161 denotes a congestion indicating arrow showing a congested zone, which is located within the remaining area other than the traffic information display restricted area, of the road L162 and the extent of the traffic congestion, H161 denotes the traffic information display restricted area, and H162 denotes the traffic information display unrestricted area in which a display of traffic information is allowed. In FIG. 17, reference character M171 denotes a mark indicating the current position of the vehicle, S171 denotes a switch for switching the display screen to the traffic information display restricted screen mode as shown in FIG. 16, each of L171 and L172 denotes a road, and each of J171, J172, and J173 denotes a congestion indicating arrow showing a congested zone, which is located within the remaining area other than the traffic information display restricted area, of the road L171 or L172 and the extent of the traffic congestion. The provision of the switches S161 and S171 makes it possible for the user to easily switch between the traffic information display unrestricted screen mode and the traffic information display restricted screen mode.

In operation, the traffic information display device, in step ST1501, determines whether or not the traffic information receiving unit 101 has received traffic information. If the traffic information display device determines that the traffic information receiving unit 101 has received traffic information, it advances to step ST1502. On the contrary, if the traffic information display device determines that the traffic information receiving unit 101 has not received traffic information yet, it terminates the traffic information display processing.

When the user, in step ST1502, makes a request to restrict the display of the traffic information by means of the operational input unit 107, the operational input unit 107 delivers the request to the image converting unit 104. When the image converting unit 104 receives the request to restrict the display of the traffic information, it proceeds to step ST1503. Then, the traffic information display restricting unit 108 restricts the display of the traffic information about the traffic information display restricted area and then advances to step ST1504. On the contrary, when the image converting unit 104 does not receive the request, it proceeds to step ST1505 in which the traffic information display restricting unit 108 displays all traffic information, which has been received by the traffic information receiving unit 101, about the on-screen map image without restricting the display of the traffic information about the traffic information display restricted area and then advances to step ST1506.

In performing step ST1504, when the image converting unit 104 receives a request to switch the traffic information display screen mode, which has been input by the user through the operational input unit 107, the image converting unit 104 advances to the step ST1505 wherein it causes the traffic information display restricting unit 108 to display all the traffic information about the on-screen map image without restricting a display of traffic information about the traffic information display restricted area. On the other hand, when the image converting unit 104 does not receive a request to switch the traffic information display screen mode, it terminates the traffic information display screen mode switching operation.

In performing step ST1506, when the image converting unit 104 receives a request to switch the traffic information display screen mode, which has been input by the user through the operational input unit 107, the image converting unit 104 advances to the step ST1503 wherein it causes the traffic information display restricting unit 108 to restrict a display of the traffic information about the traffic information display restricted area. On the other hand, when the image converting unit 104 does not receive a request to switch the traffic information display screen mode, it terminates the traffic information display screen mode switching operation.

As previously explained, since the traffic information display device according to the second embodiment can switch the display screen between the traffic information display restricted screen mode and the traffic information display unrestricted screen mode, the user can select a desired traffic information display screen mode according to the circumstances by means of a simple input operation. Thus, this embodiment can provide a traffic information display device able to allow the user to easily both recognize needed traffic information and all traffic information about an on-screen road map image while making a distinction between them.

Instead of switching between the traffic information display restricted screen mode in which a display of traffic information about a predetermined area is disabled and the traffic information display unrestricted screen mode, the traffic information display mode switching unit 1401 can switch the display screen between another traffic information display restricted screen mode in which a display of traffic information about a predetermined area is made quiet as compared with a display of traffic information about the remaining area on the screen and the traffic information display unrestricted screen mode.

Figure 18:
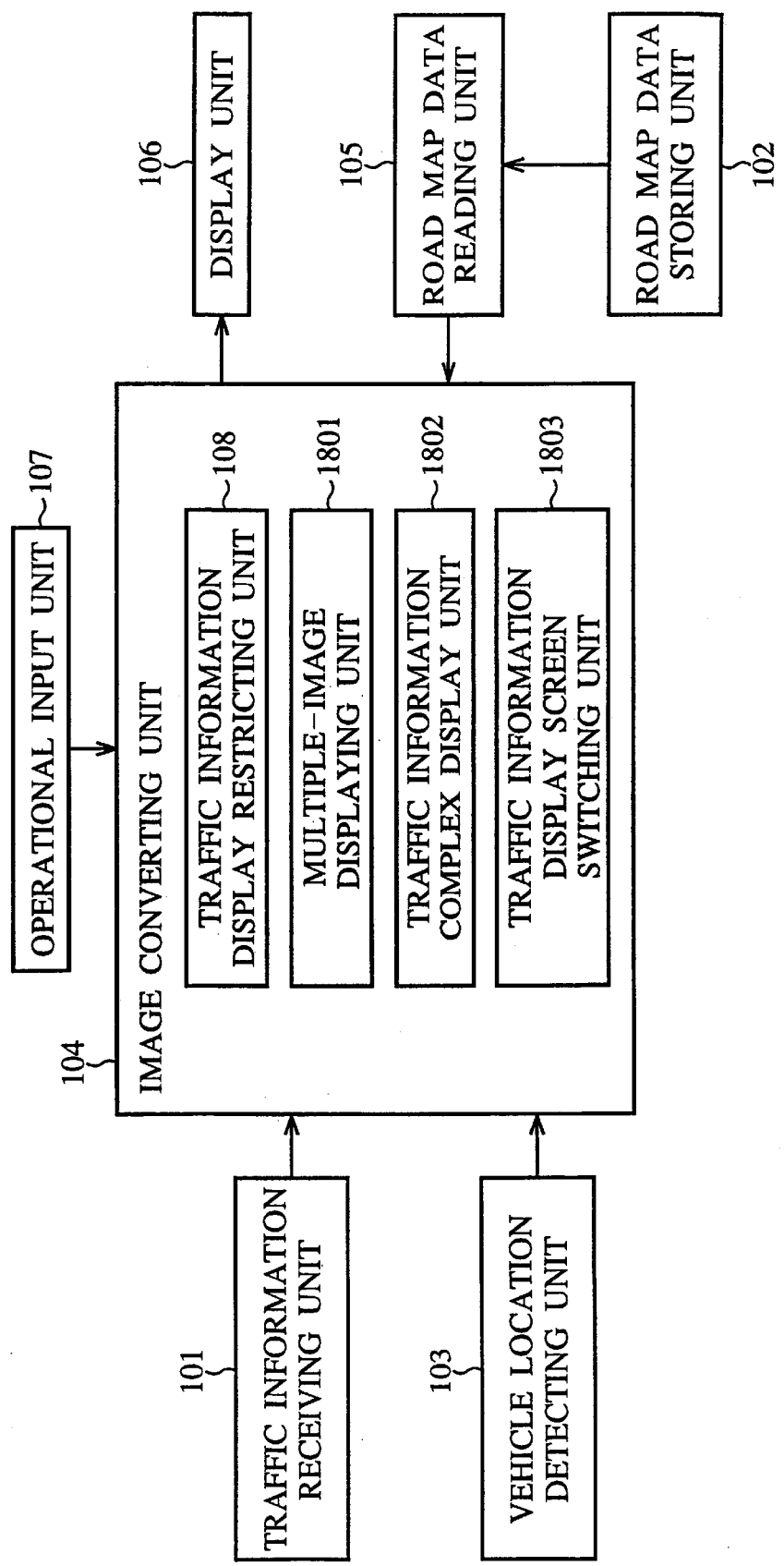
FIG. 18 is a block diagram showing the functional structure of a traffic information display device according to a third embodiment of the present invention.
Figure 19:
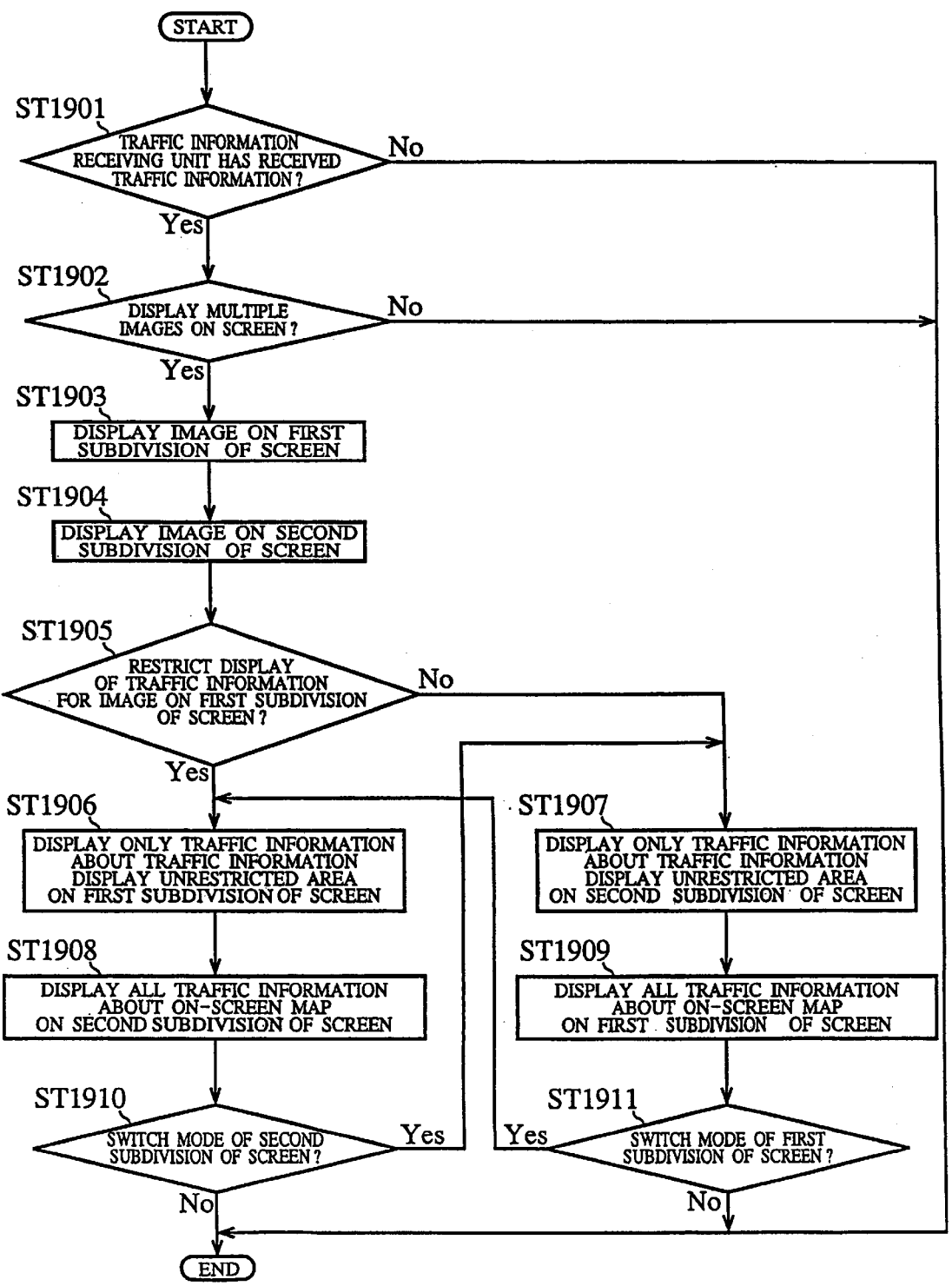
FIG. 19 is a flow diagram showing the flow of processing of the traffic information display device according to the third embodiment of the present invention.
Figure 20:
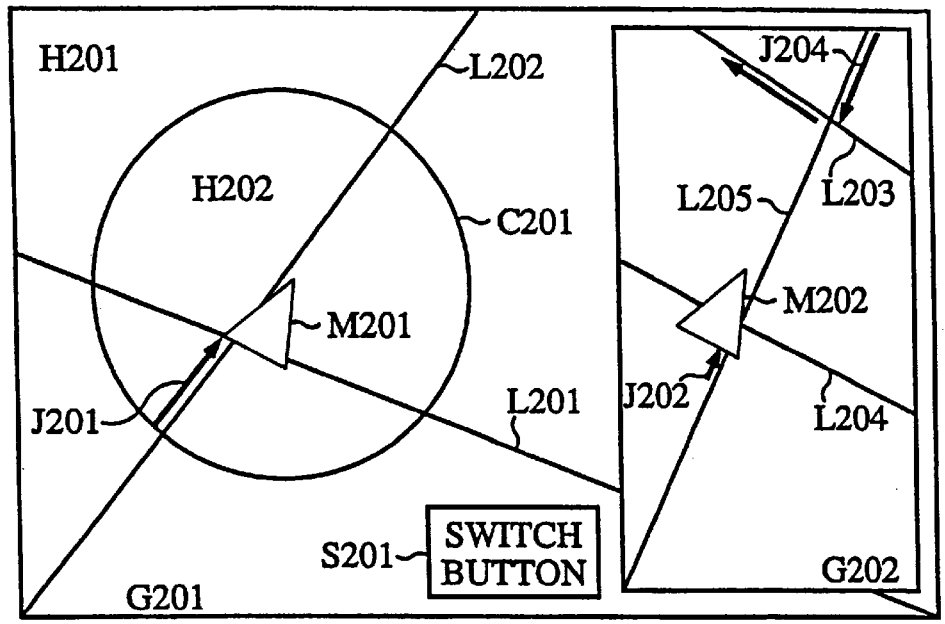
FIG. 20 is an example of the display screen of the display unit of the traffic information display device according to the third embodiment of the present invention.
Figure 21:
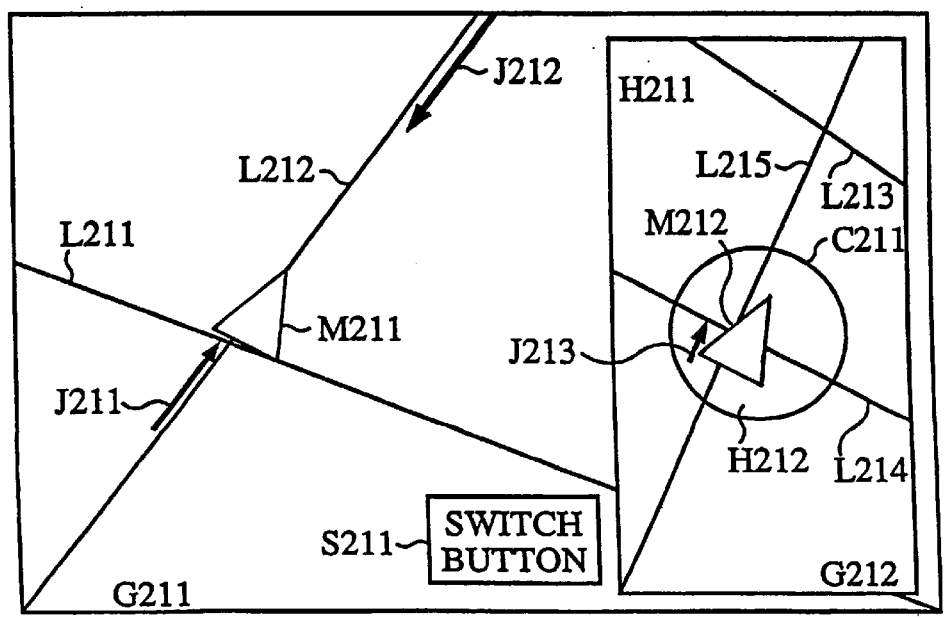
FIG. 21 is an example of the display screen of the display unit of the traffic information display device according to the third embodiment of the present invention.

Referring now to FIG. 18, there is illustrated a block diagram of a traffic information display device according to a third embodiment of the present invention. Furthermore, FIG. 19 shows a flow diagram showing the flow of processing of the traffic information display device, FIG. 20 shows an example of the display screen including two subdivisions thereof on which a road map image in the traffic information display restricted screen mode and a road map image in the traffic information display unrestricted screen mode are displayed at the same time, respectively, and FIG. 21 shows another example of the display screen including two subdivisions thereof on which a road map image in the traffic information display restricted screen mode and a road map image in the traffic information display unrestricted screen mode are displayed at the same time, respectively.

The traffic information display restricting unit 108 according to the above-mentioned second embodiment can switch the display screen between the traffic information display restricted screen mode in which a display of traffic information about the traffic information display restricted area is restricted and the traffic information display unrestricted screen mode in which all traffic information about the on-screen road map image is displayed. By contrast, the traffic information display device of this embodiment is adapted to display both a road map image in the traffic information display restricted screen mode and a corresponding road map image in the traffic information display unrestricted screen mode on the two subdivisions of the screen of the display unit 106, respectively.

In FIG. 18, reference numeral 1801 denotes a multiple-image displaying unit disposed in the image converting unit 104, for displaying two images on the two subdivisions of the screen of the display unit respectively, by means of the road map data storage unit 102 and the road map data reading unit 105, 1802 denotes a traffic information complex display unit for respectively displaying a road map image in the traffic information display restricted screen mode and a road map image in the traffic information display unrestricted screen mode on the two subdivisions of the display screen of the display unit 106 simultaneously, by means of the traffic information receiving unit 101, the traffic information display restricting unit 108, and the multiple-image displaying unit 1801, and 1803 denotes a traffic information display screen switching unit for interchanging the road map image in one subdivision and the other road map image in the other subdivision, which are displayed on the screen of the display unit. Furthermore, the multiple-image displaying unit 1801, the traffic information complex display unit 1802, the traffic information display screen switching unit 1803 can be implemented via at least the CPU 210, ROM 211, and RAM 212 as shown in FIG. 2.

In FIG. 18, the same or like components as those in the above-mentioned first and second embodiment shown in FIGS. 1 and 15 are designated by the same reference numerals, and therefore the description about the components will be omitted hereinafter. Furthermore, the hardware structure of the traffic information display device of the third embodiment is the same as that of the traffic information display device of the first embodiment, and therefore the description about the hardware structure will be omitted.

FIG. 20 shows an example of the display screen split into one subdivision G201 of the screen on which a road map image in the traffic information display restricted mode, including only traffic information about the traffic information display unrestricted area is displayed and another subdivision G202 of the screen on which a corresponding road map image in the traffic information display unrestricted mode, including all traffic information about the on-screen map image is displayed. In FIG. 20, each of reference characters M201 and M202 denotes a mark indicating the current position of the vehicle, C201 denotes a circle-shaped bounding line having a certain radius which corresponds to a predetermined distance and showing that the outside of an area enclosed by the bounding line is the traffic information display restricted area in which a display of traffic information is restricted. The mark M201 is centered in the circle-shaped bounding line C201. Furthermore, reference character S201 denotes a switch for switching the display screen to the other display screen mode as shown in FIG. 21, each of L201, L202, L203, L204 and L205 denotes a road, J201 denotes a congestion indicating arrow showing a congested zone, which is located within the remaining area other than the traffic information display restricted area, of the road L202 and the extent of the traffic congestion, each of J202, J203, and J204 denotes a congestion indicating arrow showing a congested zone, which is located within the remaining area other than the traffic information display restricted area, of the road L203 or L205 and the extent of the traffic congestion, H201 denotes the traffic information display restricted area in the subdivision G201, and H202 denotes the traffic information display unrestricted area in the subdivision G201, in which a display of traffic information is enabled.

FIG. 21 shows an example of the display screen split into one subdivision G211 of the screen on which a road map image in the traffic information display unrestricted screen mode, including all traffic information about the on-screen map image is displayed and another subdivision G212 of the screen on which a road map image in the traffic information display restricted screen mode, including only traffic information about the traffic information display unrestricted area is displayed. In FIG. 21, each of reference characters M211 and M212 denotes a mark indicating the current position of the vehicle, C211 denotes a circle-shaped bounding line having a certain radius which corresponds to a predetermined distance and showing that the outside of an area enclosed by the bounding line is the traffic information display restricted area in which a display of traffic information is restricted. The mark M212 is centered in the circle-shaped bounding line C211. Furthermore, reference character S211 denotes a switch for switching the display screen to the above display screen mode shown in FIG. 20, each of L211, L212, L213, L214 and L215 denotes a road, and each of J211 and J212 denotes a congestion indicating arrow showing a congested zone, which is located within the remaining area other than the traffic information display restricted area, of the road L212 and the extent of the traffic congestion, J213 denotes a congestion indicating arrow showing a congested zone, which is located within the remaining area other than the traffic information display restricted area, of the road L215 and the extent of the traffic congestion, H211 denotes the traffic information display restricted area in the subdivision G212 of the screen, and H212 denotes the traffic information display unrestricted area in the subdivision G212 of the screen, on which a display of traffic information is allowed.

In operation, the traffic information display device, in step ST1901, determines whether or not the traffic information receiving unit 101 has received traffic information. If the traffic information display device determines that the traffic information receiving unit 101 has received traffic information, it advances to step ST1902. On the contrary, if the traffic information display device determines that the traffic information receiving unit 101 has not received traffic information yet, it terminates the traffic information display processing.

When the user, in step ST1902, makes a request to switch the display screen to the complex display mode as mentioned above in which two road map images are simultaneously displayed on the two subdivisions of the screen of the display unit, respectively, through the operational input unit 107, the operational input unit 107 delivers the request to the image converting unit 104. When the image converting unit 104 receives the request, it proceeds to steps ST1903 and ST1904. Then, the traffic information complex display unit 1802 displays both two road map images on the two subdivisions of the display screen, respectively. And, the traffic information complex display unit 1802 advances to step ST1905. On the contrary, when the image converting unit 104 does not receive the above request in step ST1902, it terminates the traffic information complex display processing.

In performing step ST1905, when the user makes a request to restrict a display of traffic information in the first subdivision of the screen such as the subdivision G201 shown in FIG. 20, through the operational input unit 107, the operational input unit 107 delivers the request to the image converting unit 104. When the image converting unit 104 receives the request, it advances to step ST1906. On the other hand, when the user has not made the above request, the image converting unit 104 advances to step ST1907.

In performing step ST1906, the traffic information complex display unit 1802 defines the traffic information display restricted area in the first subdivision of the screen and further displays traffic information about the traffic information display unrestricted area within the area while restricting a display of traffic information about the traffic information display restricted area, and then advances to the step ST1908 wherein it displays all traffic information about the on-screen map image on the second subdivision of the screen. After that, the traffic information complex display unit 1802 proceeds to step ST1910.

In performing step ST1907, the traffic information complex display unit 1802 defines the traffic information display restricted area in the second subdivision of the screen and further displays traffic information about the traffic information display unrestricted area within the area while restricting a display of traffic information about the traffic information display restricted area, and then advances to the step ST1909 wherein it displays all traffic information about the on-screen map image on the first subdivision of the screen. After that, the traffic information complex display unit 1802 proceeds to step ST1911.

In performing step ST1910, when the user makes a request to switch the traffic information display screen mode of the second subdivision to the traffic information display restricted screen mode, that is, interchange the road map images on the first and second subdivisions of the screen, through the operational input unit 107, the operational input unit 107 delivers the request to the image converting unit 104. When the image converting unit 104 receives the request, it proceeds to step ST1907. On the other hand, when the user, in step ST1910, does not make the request to switch the traffic information display screen mode of the second subdivision to the traffic information display restricted screen mode, the image converting unit 104 terminates the traffic information complex display processing.

In performing step ST1911, when the user makes a request to switch the traffic information display screen mode of the first subdivision to the traffic information display restricted screen mode, that is, interchange the road map images on the first and second subdivisions of the screen, through the operational input unit 107, the operational input unit 107 delivers the request to the image converting unit 104. When the image converting unit 104 receives the request, it proceeds to step ST1906. On the other hand, when the user, in step ST1910, does not make the request to switch the traffic information display screen mode of the first subdivision to the traffic information display restricted screen mode, the image converting unit 104 terminates the traffic information complex display processing.

As previously explained, since the traffic information display device according to the third embodiment can simultaneously display two images in the traffic information display restricted screen mode and the traffic information display unrestricted screen mode on the two subdivisions of the screen of the display unit, respectively, the user can easily recognize both needed traffic information and all traffic information about an on-screen road map image while making a distinction between them.

Numerous variants may be made in the exemplary embodiment mentioned above. For example, the image converting unit 104 can be adapted to display traffic information display restricted road map images on the two subdivisions of the display screen, respectively, while defining individual traffic information display restricted areas for the two subdivisions of the screen. Alternatively, the image converting unit 104 can be adapted to produce a road map image in which a display of traffic information about the traffic information display restricted area is made quiet as compared with a display of traffic information about the traffic information display unrestricted area on one of the two subdivisions of the screen, instead of a road map image in which a display of traffic information about the traffic information display restricted area is disabled. It is needless to say that the variants can offer the same advantage. Furthermore, the image converting unit 104 can set the scales of the on-screen map images displayed on the two subdivisions of the screen to individual values, respectively.

Figure 22:
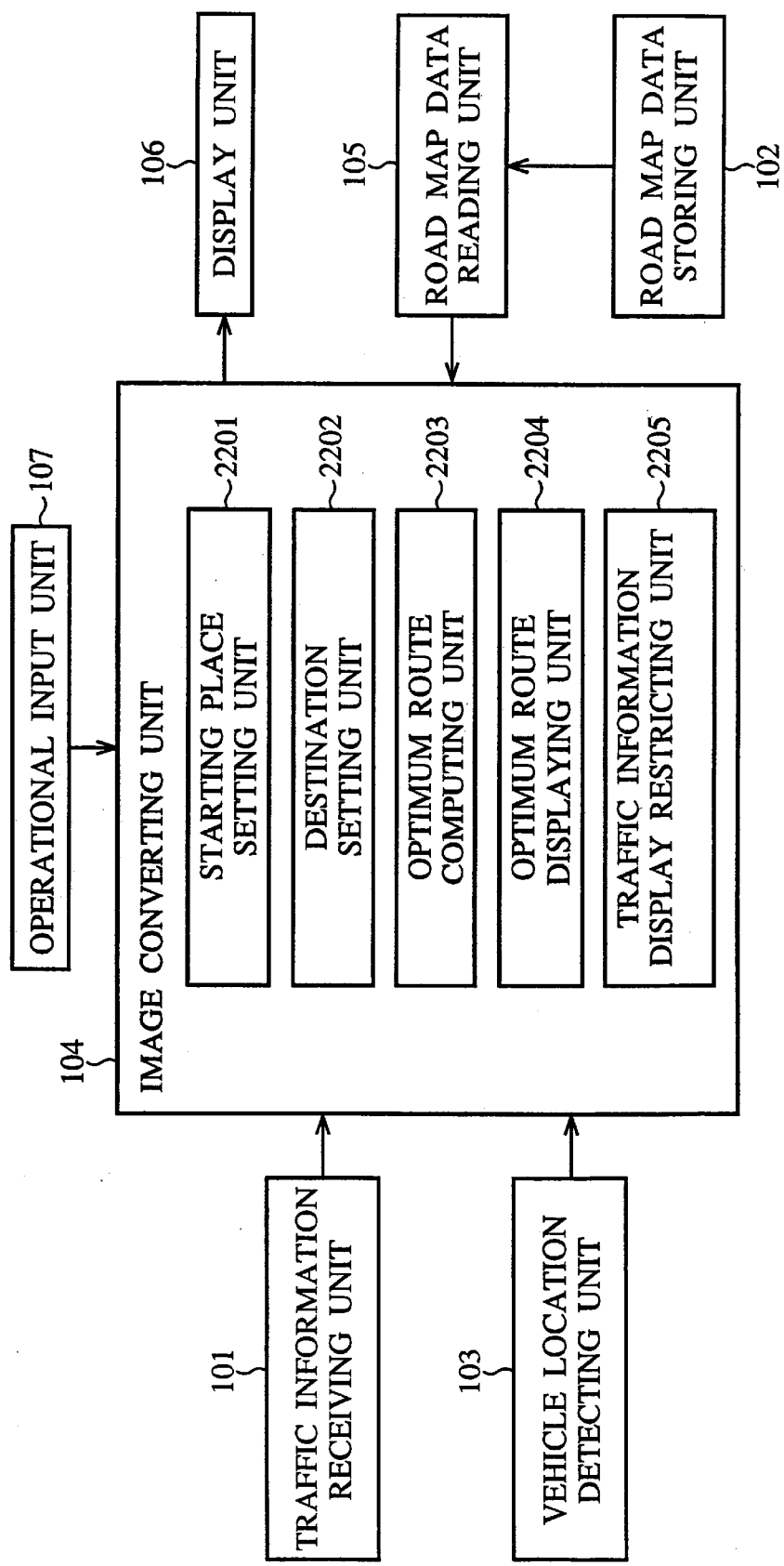
FIG. 22 is a block diagram showing the functional structure of a traffic information display device according to a fourth embodiment of the present invention.
Figure 23:
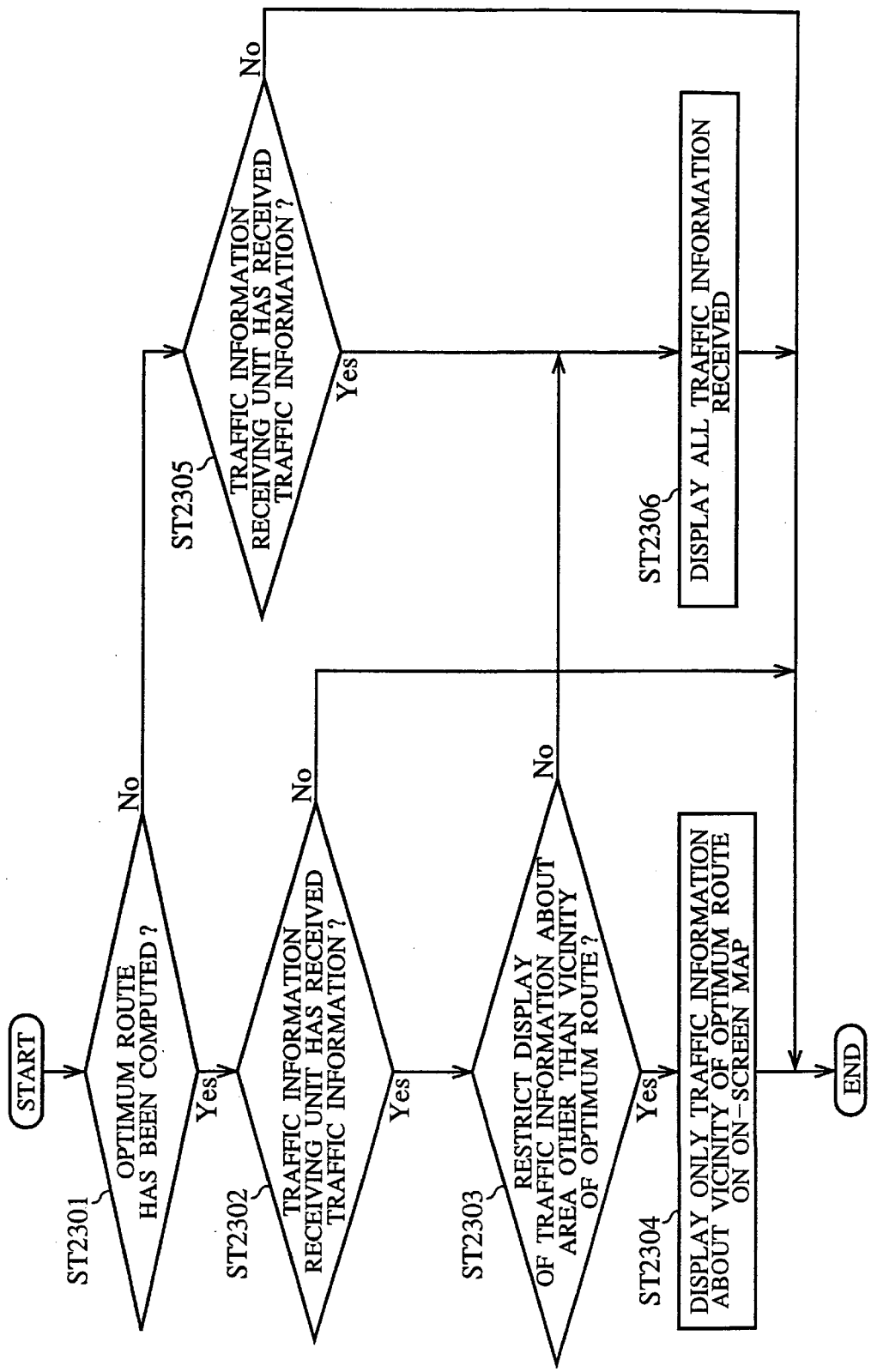
FIG. 23 is a flow diagram showing the flow of processing of the traffic information display device according to the fourth embodiment of the present invention.
Figure 24:
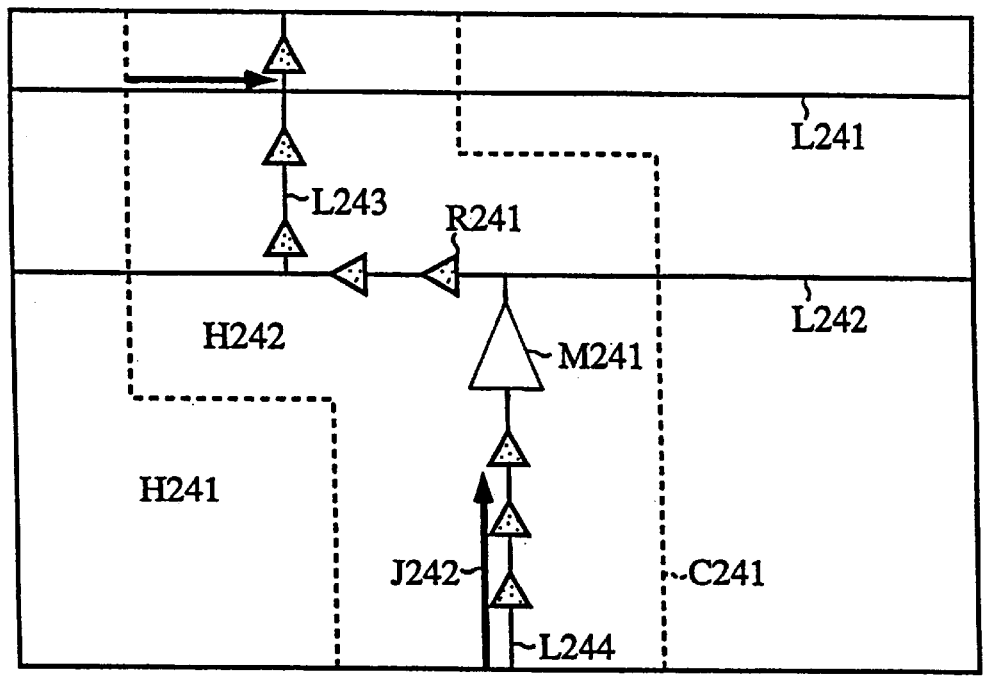
FIG. 24 is an example of the display screen of the display unit of the traffic information display device according to the fourth embodiment of the present invention.
Figure 25:
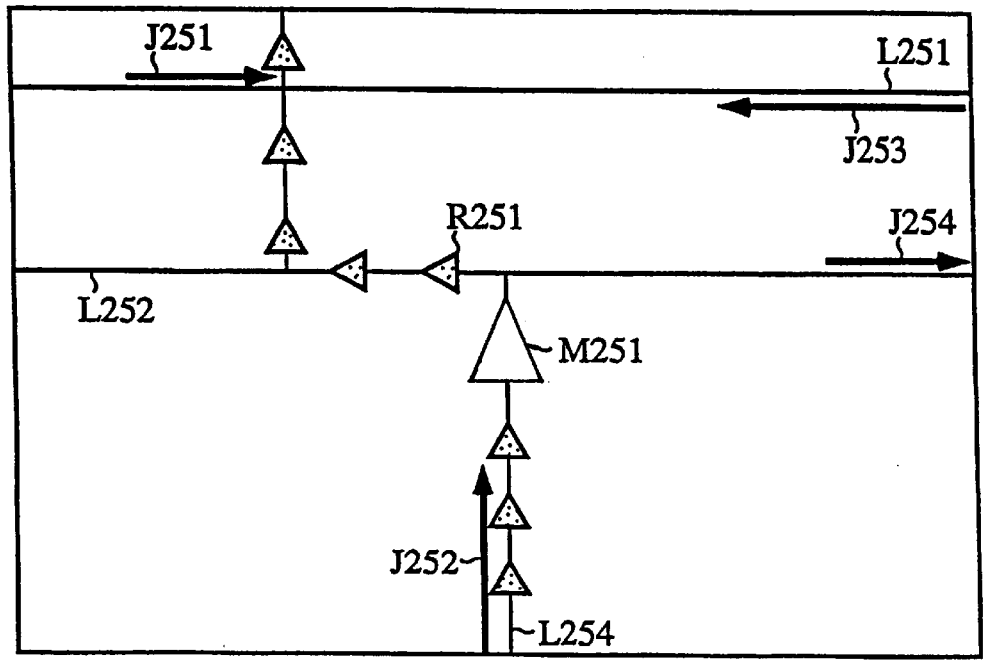
FIG. 25 is an example of the display screen of the display unit of the traffic information display device according to the fourth embodiment of the present invention.
Figure 26:
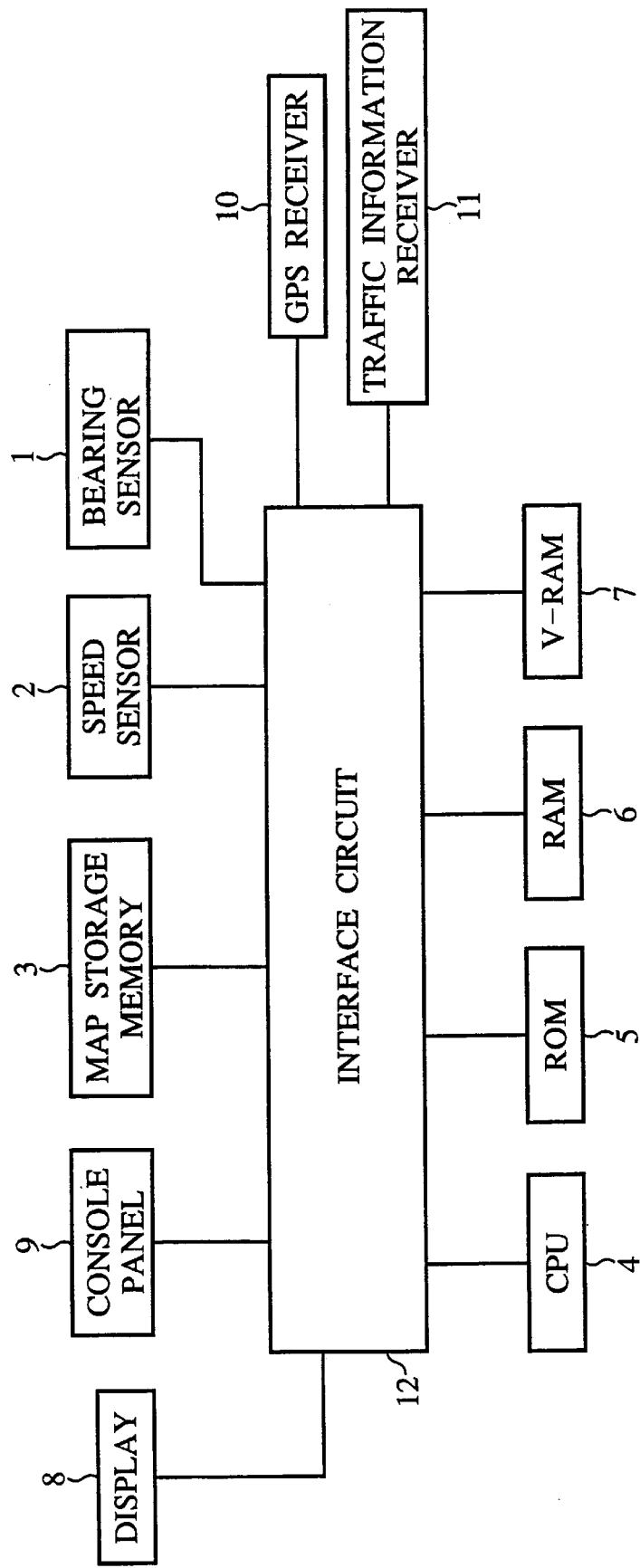
FIG. 26 is a block diagram showing the structure of a prior art traffic information display device.

Referring now to FIG. 22, there is illustrated a block diagram of a traffic information display device according to a fourth embodiment of the present invention. Furthermore, FIG. 23 shows a flow diagram showing the flow of processing of the traffic information display device, FIG. 24 shows an example of the display screen on which a display of traffic information about the traffic information display restricted area is restricted, and FIG. 25 shows another example of the display screen on which a display of traffic information is not restricted.

The traffic information display device according to either one of the above-mentioned embodiments is adapted to restrict a display of traffic information about an area other than a predetermined area in the vicinity of the present position of the vehicle. By contrast, the traffic information display device of this embodiment is adapted to, when an optimum route is obtained, restrict a display of traffic information about an area other than a predetermined area in the vicinity of the optimum route.

In FIG. 22, reference numeral 2201 denotes a starting place setting unit disposed in the image converting unit 104, for setting a starting place of the vehicle according to an input by the user through the operational input unit 107, 2202 denotes a destination setting unit for setting a destination of the vehicle according to an input by the user through the operational input unit 107, 2203 denotes an optimum route computing unit for computing an optimum route from the starting place set by the starting place setting unit 2201 to the destination set by the destination setting unit 2202 by means of the road map data storage unit 102 and the road map data reading unit 105, 2204 an optimum route display unit for displaying the optimum route computed by the optimum route computing unit 2203 on the screen of the display unit 106, and 2205 denotes a traffic information display restricting unit for restricting a display of traffic information about an area other than the vicinity of the optimum route. Furthermore, the starting place setting unit 2201, the destination setting unit 2202, the optimum route computing unit 2203, the optimum route displaying unit 2204, and the traffic information display restricting unit 2205 can be implemented via at least the CPU 210, ROM 211, and RAM 212 as shown in FIG. 2.

In FIG. 22, the same or like components as those in the above-mentioned first, second, and third embodiment shown in FIGS. 1, 15, and 18 are designated by the same reference numerals, and therefore the description about the components will be omitted hereinafter. Furthermore, the hardware structure of the traffic information display device of the fourth embodiment is the same as that of the traffic information display device of the first embodiment, and therefore the description about the hardware structure will be omitted.

FIG. 24 shows an example of the display screen on which only traffic information about an area other than the traffic information display restricted area is displayed. In FIG. 24, reference character M241 denotes a mark indicating the current position of the vehicle, C241 denotes a bounding line located at a predetermined distance from the on-screen optimum route and showing the boundary between the traffic information display restricted area in which a display of traffic information is restricted and the traffic information display unrestricted area in which a display of traffic information is allowed, R241 denotes an optimum route mark showing the optimum route, each of L241, L242, L243, and L244 denotes a road, each of J241 and J242 denotes a congestion indicating arrow showing a congested zone, which is located within the remaining area other than the traffic information display restricted area, of the road L241 or L244 and the extent of the traffic congestion, H241 denotes the traffic information display restricted area, and H242 denotes the traffic information display unrestricted area.

FIG. 25 shows an example of the display screen on which all traffic information about the on-screen map image is displayed. In FIG. 25, reference character M251 denotes a mark indicating the current position of the vehicle, R251 denotes an optimum route mark showing the optimum route, each of L251, L252, L253, and L254 denotes a road, and each of J251, J252, J253, and J254 denotes a congestion indicating arrow showing a congested zone, which is located within the remaining area other than the traffic information display restricted area, of the road L251, L252, or L254 and the extent of the traffic congestion.

In operation, the traffic information display device, in step ST2301, determines whether or not it has already obtained an optimum route. If the traffic information display device determines that it has computed an optimum route, it advances to step ST2302. On the contrary, if the traffic information display device determines that it has not computed an optimum route yet, it advances to step ST2305.

In performing step ST2302, the traffic information display device determines whether or not the traffic information receiving unit 101 has received traffic information. If the traffic information display device determines that the traffic information receiving unit 101 has received traffic information, it advances to step ST2303. On the contrary, if the traffic information display device determines that the traffic information receiving unit 101 has not received traffic information yet, it terminates the traffic information display processing.

When the user, in step ST2303, makes a request to restrict a display of traffic information about the traffic information display restricted area other than the vicinity of the optimum route through the operational input unit 107, the operational input unit 107 delivers the request to the image converting unit 104. When the image converting unit 104 receives the request, it proceeds to steps ST2304 wherein the traffic information display restricting unit 2205 produces a screen display in which a display of traffic information about the traffic information display restricted area other than the vicinity of the optimum route is restricted, as shown in FIG. 24. Then, the traffic information display restricting unit 2205 terminates the traffic information display restricting processing. On the contrary, when the image converting unit 104 does not receive the request to restrict a display of traffic information about the traffic information display restricted area other than the vicinity of the optimum route in step ST2303, it advances to step ST2306 wherein the traffic information display restricting unit 2205 displays traffic information, which has been received by the traffic information receiving unit 101, about the road map image on the screen of the display unit and then terminates the traffic information display restricting processing.

On the other hand, when the image converting unit 104, in step ST2305, determines that the traffic information receiving unit 101 has received traffic information, it advances to step ST2306 wherein it displays all the traffic information, which has been received by the traffic information receiving unit 101, about the road map image on the screen of the display unit and then terminates the traffic information display restricting processing. On the contrary, when the image converting unit 104, in step ST2305, determines that the traffic information receiving unit 101 has not received traffic information yet, it terminates the traffic information display restricting processing.

As previously explained, since the traffic information display device according to the fourth embodiment can select only traffic information about the optimum route and the vicinity of the optimum route from a large amount of traffic information received to provide the user with them, the user can easily recognize only the traffic information about the optimum route and the vicinity of the optimum route.

Numerous variants may be made in the exemplary embodiment mentioned above. For example, the image converting unit 104 can make a display of traffic information about the traffic information display restricted area other than the vicinity of the optimum route quiet, instead of disabling the display of the traffic information. Furthermore, the image converting unit 104 can define both the vicinity of the optimum route and an arbitrary area as the traffic information display restricted area, and alternatively vary the traffic information display restricted area in the vicinity of the optimum route according to the speed of the vehicle.

As previously explained, the present invention offers the following advantages.

The traffic information display device according to either one of the above-mentioned embodiments comprises the traffic information display restricting unit for restricting a display of traffic information about a predetermined area so as to emphasize a display of traffic information about the remaining area of the on-screen map image other than the predetermined area. Therefore, since the traffic information display device can select needed traffic information from a large amount of traffic information to provide only the needed traffic information while restricting a display of traffic information about the predetermined area, which the user does not need, the user can easily recognize the needed traffic information.

In accordance with a preferred embodiment of the present invention, the traffic information display restricting unit is adapted to make the display of the traffic information about the predetermined area quiet as compared with the display of the traffic information about the remaining area. Therefore, since the traffic information display device can emphasize the display of needed traffic information while displaying the traffic information about the predetermined area when receiving a large amount of traffic information, which the user does not need, the user can easily recognize the needed traffic information without doubting whether or not there exists some pieces of traffic information about the predetermined area.

In accordance with another preferred embodiment of the present invention, the traffic information display restricting unit is adapted to disable the display of the traffic information about the predetermined area. Therefore, since the traffic information display device does not display the traffic information about the predetermined area, which the user does not need, the user can easily recognize the needed traffic information.

In accordance with another preferred embodiment of the present invention, the traffic information display device further comprises a traffic information display restricted area indicating unit for producing a display for making a distinction between the predetermined area in which a display of traffic information is restricted, i.e., the traffic information display restricted area, and the remaining area in which a display of traffic information is allowed, i.e., the traffic information display unrestricted area. Therefore, the user can easily recognize the traffic information display restricted area.

In accordance with another preferred embodiment of the present invention, the traffic information display restricted area indicating unit displays a boundary between the traffic information display restricted area and the traffic information display unrestricted area on the on-screen road map image. Thereby, the user can recognize the traffic information display restricted area more easily.

In accordance with another preferred embodiment of the present invention, the traffic information display device further comprises a traffic information display restricted area setting unit for setting the traffic information display restricted area according to operational inputs by the user through an operational input unit. Therefore, since the user can optionally adjust the amount of needed traffic information to be displayed on the traffic information display unrestricted area by selecting the traffic information to be displayed from a large amount of traffic information delivered to the traffic information display device, the user can easily recognize the needed traffic information.

In accordance with another preferred embodiment of the present invention, the traffic information display device further comprises a traffic information display restricted area control unit for varying the traffic information display restricted area as the speed of the vehicle increases in such a manner that a part of the remaining area at the front of the vehicle becomes larger than a part of the remaining area at the back of the vehicle. Therefore, since the traffic information display device can automatically adjust the amount of needed traffic information to be displayed on the traffic information display unrestricted area according to the speed of the vehicle even though it has received a large amount of traffic information, the user can recognize the needed traffic information about a larger area at an earlier time with increases in the speed of the vehicle.

In accordance with another preferred embodiment of the present invention, the traffic information display device further comprises a traffic information display restricted area control unit for, when the scale of the on-screen map image is varied, defining the traffic information display restricted area in such a manner that the on-screen size of the remaining area in which a display of traffic information is allowed remains invariant regardless of a variation in the scale of the map image. Therefore, since the traffic information display device can automatically adjust the amount of needed traffic information to be displayed on the traffic information display unrestricted area according to the speed of the vehicle even though it has received a large amount of traffic information, the user can recognize the needed traffic information more precisely.

In accordance with another preferred embodiment of the present invention, the traffic information display device further comprises a traffic information display restricted area control switching unit for switching the traffic information display restricted area to a state in which a display of traffic information is enabled, and the traffic information display unrestricted area to a state in which a display of traffic information is restricted. Therefore, since the user can optionally adjust the amount of needed traffic information to be displayed on the traffic information display unrestricted area even though the traffic information display device has received a large amount of traffic information, the user can easily recognize the needed traffic information.

In accordance with another preferred embodiment of the present invention, the traffic information display device further comprises a traffic information display mode switching unit for switching between the traffic information display restricted screen mode in which a display of traffic information about the traffic information display restricted area is restricted and the traffic information display unrestricted screen mode in which a display of traffic information about the traffic information display restricted area is unrestricted. Therefore, since the user can switch the display screen to a desired traffic information display screen mode according to the circumstances, the user can recognize needed traffic information more precisely while making a distinction between the needed traffic information and all the traffic information about the road map image on-screen.

In accordance with another preferred embodiment of the present invention, the traffic information display device further comprises a traffic information complex display unit for simultaneously displaying both a road map image in which the display of the traffic information about the traffic information display restricted area is restricted, and another corresponding road map image in which all the traffic information about the on-screen map image is displayed, on two subdivisions of the screen of the display device. Therefore, the user can recognize needed traffic information precisely while easily making a distinction between the needed traffic information and all the traffic information about the road map image on-screen.

In accordance with another preferred embodiment of the present invention, the traffic information display device further comprises a traffic information display screen switching unit for interchanging the road map image in which the display of the traffic information about the traffic information display restricted area is restricted, and the other corresponding road map image in which all the traffic information about the on-screen map image is displayed. Therefore, by positioning one of the two subdivisions at the center of the display screen, the traffic information display device can display either one of the traffic information display restricted road map image and the traffic information display unrestricted road map image at the center of the display screen, according to a request by the user. Accordingly, the user can recognize needed traffic information more precisely while easily making a distinction between the needed traffic information and all the traffic information about the road map image on-screen.

In accordance with another preferred embodiment of the present invention, the traffic information display device further comprises an optimum route computing unit for computing an optimum route from the starting place to the destination on the basis of the road map data stored in the road map data storing unit, and a traffic information display restricted area setting unit for setting the traffic information display restricted area in which a display of traffic information is restricted according to the optimum route. The traffic information display restricting unit restricts the display of the traffic information about the traffic information display restricted area other than the vicinity of the optimum route. Accordingly, the user can easily recognize needed traffic information about the optimum route and roads in the vicinity of the optimum route when the user is driving by way of the optimum route and the traffic information display unit has received a large amount of traffic information.

In accordance with another preferred embodiment of the present invention, the traffic information display device further comprises a unit for detecting roads that are not connected to a road on which the vehicle is moving on the basis of the road map data stored in the road map data storing unit. The traffic information display restricted area setting unit adds the roads unconnected to the road on which the vehicle is moving, to the traffic information display restricted area. Accordingly, the user can easily recognize the traffic information about only roads connected to the road on which the vehicle is moving.

In accordance with another preferred embodiment of the present invention, the traffic information display restricted area setting unit can set the predetermined area in such a manner that a part of the traffic information display unrestricted area at the front of the vehicle is larger than a part of the traffic information display unrestricted area at the back of the vehicle. Accordingly, the user can recognize a larger amount of traffic information about an area ahead of the vehicle.

In accordance with another preferred embodiment of the present invention, in the case of a piece of traffic information to be split over the boundary between the traffic information display restricted area and the traffic information display unrestricted area, the traffic information display restricting unit can display all of the piece of traffic information without restricting the display of part of the piece of traffic information about the traffic information display restricted area. Accordingly, the user can recognize all of the piece of traffic information precisely.

Many widely different embodiments of the present invention may be constructed without departing from the spirit and scope of the present invention. It should be understood that the present invention is not limited to the specific embodiments described in the specification, except as defined in the appended claims.

What is claimed is:

1. A traffic information display device comprising:
   a current position detecting means for detecting a current position of a vehicle in which said traffic information display device as mounted;
   a road map storing means for storing road map data;
   a map display control means for displaying a road map image associated with an area in the vicinity of the current position of the vehicle on the screen of a display device on the basis of the current position from said current position detecting means and road map data from said road map storing means;
   a traffic information receiving means for receiving traffic information;
   a traffic information display control means for displaying traffic information from said traffic information receiving means on the road map image displayed on the screen of the display device;

a traffic information display restricting means for restricting a display of traffic information about a predetermined area of the on-screen road map image so as to efficiently recognize traffic information about the remaining area of the on-screen map image including the current position of the vehicle other than the predetermined area; and a traffic information display restricted area control means for varying the predetermined area in which a display of traffic information is restricted according to the speed of the vehicle.

2. The traffic information display device according to claim 1, wherein said traffic information display restricting means makes the display of the traffic information about the predetermined area quiet as compared with that of the traffic information about the remaining area.

3. The traffic information display device according to claim 1, wherein said traffic information display restricting means disables the display of the traffic information about the predetermined area.

4. The traffic information display device according to claim 1, further comprising a traffic information display restricted area indicating means for producing a display for making a distinction between the predetermined area in which a display of traffic information is restricted and the remaining area in which a display of traffic information is allowed.

5. The traffic information display device according to claim 4, wherein said traffic information display restricted area indicating means displays a boundary between the predetermined area and the remaining area on the on-screen road map image.

6. The traffic information display device according to claim 5, wherein said traffic information display restricted area indicating means further efficiently recognize a display of traffic information on roads other than the traffic information about the predetermined area within the predetermined area.

7. The traffic information display device according to claim 5, wherein said boundary surrounds the vehicle on the on-screen road map image.

8. The traffic information display device according to claim 7, wherein said traffic information display restricted area control means varies the predetermined area with increases in the speed of the vehicle in such a manner that a part of the remaining area at the front of the vehicle becomes larger than a part of the remaining area at the back of the vehicle.

9. The traffic information display device according to claim 1, wherein said traffic information display restricted area control means, when the scale of the on-screen map image is varied, defines the predetermined area in such a manner that the on-screen size of the remaining area in which a display of traffic information is allowed remains invariant regardless of a variation in the scale of the map image.

10. The traffic information display device according to claim 1, further comprising a starting place setting means for setting a starting place of the vehicle, a destination setting means for setting a destination of the vehicle, an optimum route computing means for computing an optimum route from the starting place to the destination on the basis of the road map data stored in said road map data storing means, and a traffic information display restricted area setting means for setting the predetermined area in which a display of traffic information is restricted according to the optimum route.

11. The traffic information display device according to claim 1, further comprising a means for detecting roads that are not connected to a road on which the vehicle is moving on the basis of the road map data stored in said road map data storing means, wherein said traffic information display restricting means also restricts the display of the roads unconnected to the road on which the vehicle is moving.

12. The traffic information display device according to claim 1, further comprising a traffic information display restricted area setting means for setting the predetermined area in such a manner that a part of the remaining area at the front of the vehicle is larger than a part of the remaining area at the back of the vehicle.

13. The traffic information display device according to claim 1, wherein said map display control means can simultaneously display both a road map image in which the display of the traffic information about the predetermined area is restricted by said traffic information display restricting means, and another road map image in which all pieces of traffic information about the on-screen map image are displayed, on the screen of the display device.

14. The traffic information display device according to claim 1, wherein in the case of a piece of traffic information to be split over the boundary between the predetermined area and the remaining area, said traffic information display restricting means displays all of the piece of traffic information without restricting a display of part of the piece of traffic information about the predetermined area.

15. The traffic information display device according to claim 1, wherein said traffic information display restricted area control means extends the predetermined area in a direction of travel of the vehicle with increasing speed of the vehicle.

16. A method of displaying traffic information, comprising steps of:

displaying a road map image associated with an area in the vicinity of a current position of a vehicle on a display screen of a display device on the basis of the current position of the vehicle and the road map data;

displaying traffic information on the on-screen road map image;

restricting a display of traffic information about a predetermined area of the on-screen map image so as to efficiently recognize traffic information about the remaining area of the on-screen map image including the current position of the vehicle other than the predetermined area; and varying the predetermined area in which a display of traffic information is restricted according to the speed of the vehicle.

17. The method according to claim 16, wherein in the restricting step, the display of the traffic information about the predetermined area is made quiet as compared with that of the traffic information about the remaining area.

18. The method according to claim 16, wherein in the restricting step, the display of the traffic information about the predetermined area is disabled.

19. A medium on which a software program for controlling a display of traffic information by means of a computer is recorded, wherein said program displays a map image associated with an area in the vicinity of a current position of a vehicle on a display screen of a display device on the basis of the current position of the vehicle and road map data, displays traffic information on the on-screen map image, restricts a display of traffic information about a predetermined area of the on-screen map image so as to efficiently recognize traffic information about the remaining area of the on-screen map image including the current position of the vehicle other than the predetermined area, and varies the predetermined area in which a display of traffic information is restricted according to the speed of the vehicle.

20. The medium according to claim 19, wherein the program makes the display of the traffic information about the predetermined area quiet as compared with that of the traffic information about the remaining area.

21. The medium according to claim 19, wherein the program disables the display of the traffic information about the predetermined area.

* * * * *